US 9,978,111 B2

United States Patent
Jat et al.

(10) Patent No.: US 9,978,111 B2
(45) Date of Patent: May 22, 2018

(54) METHOD AND SYSTEM FOR RECOMMENDING ONE OR MORE VEHICLES FOR ONE OR MORE REQUESTORS

(71) Applicant: Conduent Business Services, LLC, Dallas, TX (US)

(72) Inventors: Sharmistha Jat, Pune (IN); Koyel Mukherjee, Bangalore (IN); Narayanan Unny Edakunni, Bangalore (IN); Pallavi Manohar, Thane (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 508 days.

(21) Appl. No.: 14/687,035

(22) Filed: Apr. 15, 2015

(65) Prior Publication Data
US 2016/0307287 A1      Oct. 20, 2016

(51) Int. Cl.
*G01C 21/34*    (2006.01)
*G06Q 50/30*    (2012.01)
*G06Q 30/06*    (2012.01)

(52) U.S. Cl.
CPC ......... *G06Q 50/30* (2013.01); *G01C 21/3438* (2013.01); *G01C 21/3453* (2013.01); *G06Q 30/0631* (2013.01); *G01C 21/34* (2013.01)

(58) Field of Classification Search
None
See application file for complete search history.

(56) References Cited

U.S. PATENT DOCUMENTS 5,168,451 A * 12/1992 Bolger ............... G08G 1/127
                                                340/994
7,146,270 B2 * 12/2006 Nozaki ............... G06Q 10/02
                                                701/465
(Continued)

FOREIGN PATENT DOCUMENTS

CA       2780129 A1 *  5/2011

OTHER PUBLICATIONS

Jaillet, Patrick, "A Priori Solution of a Travelling Salesman Problem in Which a Random Subset of teh Customers Are Visited," Oper. Res., 36(6): 929-936, Nov. 1988.*
(Continued)

*Primary Examiner* — Nicholas D Rosen
(74) *Attorney, Agent, or Firm* — Jones Robb PLLC

(57) ABSTRACT

The disclosed embodiments illustrate methods and systems for recommending one or more vehicles, commuting on a predefined route, for one or more requestors. The method includes determining a first additional distance traversable by each vehicle apart from the predefined route to accommodate each requestor. Further, a graph comprising a first set of nodes representing the one or more requestors, and a second set of nodes representing the one or more vehicles, is generated. Thereafter, a mapping between the first set of nodes and the second set of nodes is determined based on the first additional distance. The mapping corresponds to an allocation of a requestor to a vehicle such that an additional distance traversable by the vehicle is less than an additional distance traversable by remaining vehicles apart from the predefined route. Thereafter, the one or more vehicles are recommended for the one or more requestors based on the mapping.

21 Claims, 11 Drawing Sheets

(56) References Cited

U.S. PATENT DOCUMENTS

| | | | |
|---|---|---|---|
| 8,612,273 B2 | 12/2013 | Johnson | |
| 8,626,565 B2 | 1/2014 | Petroff | |
| 9,483,744 B2* | 11/2016 | Lord | G06Q 50/30 |
| 2004/0236502 A1* | 11/2004 | Nozaki | G06Q 10/02 701/517 |
| 2007/0234257 A1* | 10/2007 | Pandey | G06F 17/5072 716/105 |
| 2009/0327011 A1* | 12/2009 | Petroff | G06Q 10/02 705/5 |
| 2010/0299177 A1* | 11/2010 | Buczkowski | G06Q 10/06 705/7.13 |
| 2011/0246246 A1* | 10/2011 | Johnson | G06Q 10/02 705/5 |
| 2012/0078672 A1 | 3/2012 | Mohebbi et al. | |
| 2012/0253654 A1 | 10/2012 | Sun et al. | |
| 2014/0365250 A1* | 12/2014 | Ikeda | G06Q 50/30 705/5 |
| 2015/0324718 A1* | 11/2015 | Lord | G06Q 50/30 705/7.13 |

OTHER PUBLICATIONS

Charikar, M., et al., "Algorithms for Capacitated Vehicle Routing," SIAM J. Comput., vol. 31, No. 3, pp. 665-682 (2201).*

Ak, Aykagan, and Erera, Alan L., "A Paired-Vehicle Recourse Strategy for teh VEhicle-Routing Problem with Stochastic Demands," Transportation Science, 41(2): 222-237, May 2007.*

Hagberg, Aric A., Schult, Daniel A., and Swart, Pieter J., "Exploring Network Structure, Dynamics, and Function Using NetworkX," Proceedings of the 7th Python in Science Conference (SciPy2008), pp. 11-15, Pasadena, CA, USA, Aug. 2008.*

Mitchell, Stuart, O'Sullivan, Michael, and Dunning, Iain, "Pulp: A Linear Programming Toolkit for Python," 2011.*

Alan L. Erera and C. Daganzo. A dynamic scheme for stochastic vehicle routing. http://www2.isye.gatech.edu/people/faculty/AlanErera=pubs=ereradaganzo2003:pdf; 2003.

Morton Klein. A primal method for minimal cost flows, with applications to the assignment and transportation problems, 1967.

* cited by examiner

METHOD AND SYSTEM FOR RECOMMENDING ONE OR MORE VEHICLES FOR ONE OR MORE REQUESTORS

TECHNICAL FIELD

The presently disclosed embodiments are related, in general, to transportation systems. More particularly, the presently disclosed embodiments are related to methods and systems for recommending one or more vehicles for one or more requestors.

BACKGROUND

Transport agencies of today may provide customized transport solutions to individuals and organizations. The transport solutions may involve a requestor booking a vehicle upfront and making changes to his/her request, including cancelling the request at the very last moment. However, handling such dynamic changes may be cumbersome and further may result in cost overhead for the transport agencies.

Further, several organizations may provide pickup and drop facilities to their employees. Such organizations may hire a predetermined number of vehicles from the transport agencies based on a predetermined work schedule of the employees. Though the work schedule of the employees may be known beforehand, there may be last minute changes in the work schedule of certain employees, e.g., due to overtime. Further, some employees may be on leave and may not use the pickup and drop facilities. Thus, the vehicles hired by the organizations may be underutilized. This is may result in high cost overhead for the organizations.

SUMMARY

According to embodiments illustrated herein, there is provided a method for recommending one or more vehicles, commuting on a predefined route, for one or more requestors. The method includes determining, by one or more processors, for each of the one or more requestors, a first additional distance that each of the one or more vehicles has to traverse apart from the predefined route to accommodate the one or more requestors. The method further includes generating, by the one or more processors, a graph comprising a first set of nodes and a second set of nodes. The first set of nodes corresponds to the one or more requestors and the second set of nodes corresponds to the one or more vehicles. Thereafter, the one or more processors determine a mapping between the first set of nodes and the second set of nodes based on at least the first additional distance. The mapping corresponds to an allocation of a requestor, from the one or more requestors, to a vehicle, from the one or more vehicles, such that an additional distance traversable by the vehicle apart from the predefined route is less than an additional distance traversable by each of remaining of the one or more vehicles apart from the predefined route, for accommodating the requestor. Further, the one or more processors recommend the one or more vehicles for the one or more requestors on a computing device based on the mapping.

According to embodiments illustrated herein, there is provided a system for recommending one or more vehicles, commuting on a predefined route, for one or more requestors. The system includes one or more processors configured to determine for each of the one or more requestors, a first additional distance that each of the one or more vehicles has to traverse apart from the predefined route to accommodate the one or more requestors. The one or more processors are further configured to generate a graph comprising a first set of nodes and a second set of nodes. The first set of nodes corresponds to the one or more requestors and the second set of nodes corresponds to the one or more vehicles. Thereafter, a mapping is determined between the first set of nodes and the second set of nodes based on at least the first additional distance. The mapping corresponds to an allocation of a requestor, from the one or more requestors, to a vehicle, from the one or more vehicles, such that an additional distance traversable by the vehicle apart from the predefined route is less than an additional distance traversable by each of remaining of the one or more vehicles apart from the predefined route, for accommodating the requestor. Further, the one or more vehicles are recommended for the one or more requestors on a computing device based on the mapping.

According to embodiments illustrated herein, there is provided a computer program product for use with a computing device. The computer program product comprises a non-transitory computer readable medium storing a computer program code for recommending one or more vehicles, commuting on a predefined route, for one or more requestors. The computer program code is executable by one or more processors in the computing device to determine for each of the one or more requestors, a first additional distance that each of the one or more vehicles has to traverse apart from the predefined route to accommodate the one or more requestors. The computer program code is further executable by the one or more processors to generate a graph comprising a first set of nodes and a second set of nodes. The first set of nodes corresponds to the one or more requestors and the second set of nodes corresponds to the one or more vehicles. Thereafter, a mapping is determined between the first set of nodes and the second set of nodes based on at least the first additional distance. The mapping corresponds to an allocation of a requestor, from the one or more requestors, to a vehicle, from the one or more vehicles, such that an additional distance traversable by the vehicle apart from the predefined route is less than an additional distance traversable by each of remaining of the one or more vehicles apart from the predefined route, for accommodating the requestor. Further, the one or more vehicles are recommended for the one or more requestors on a computing device based on the mapping.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
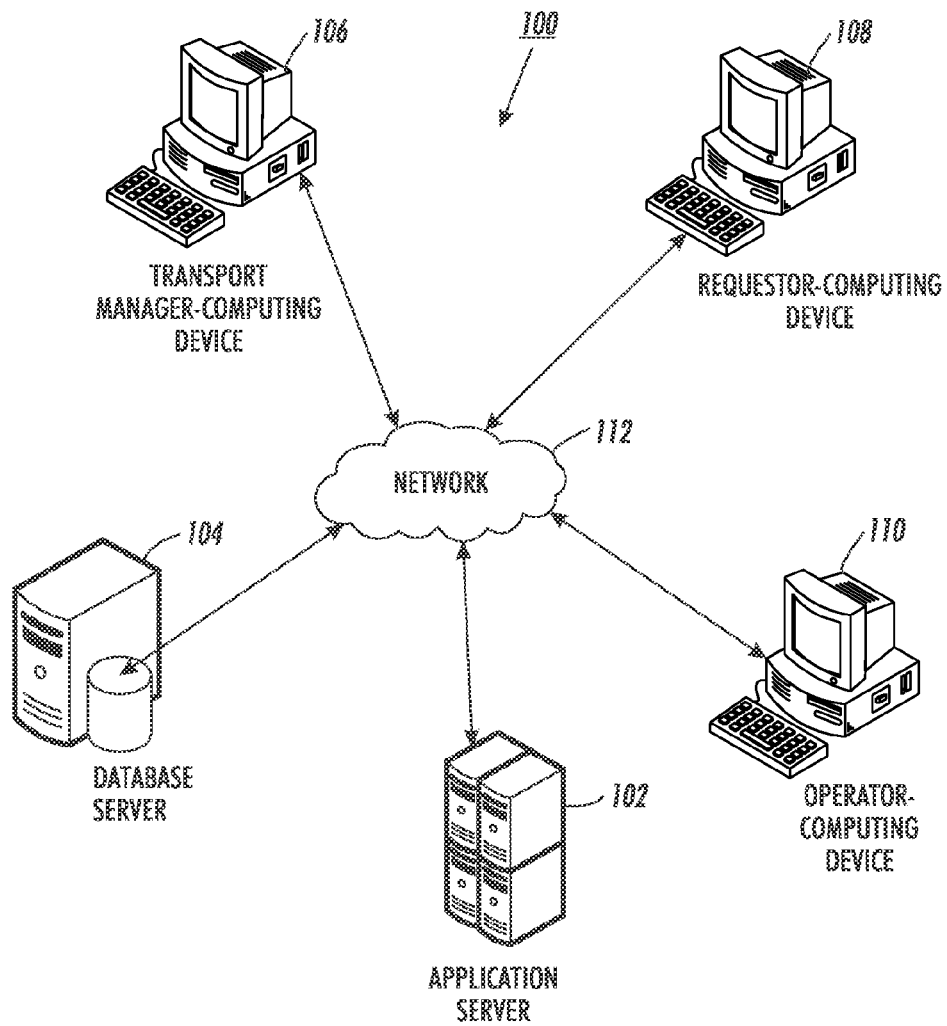
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

"First additional distance" refers to a minimum extra distance that a vehicle may have to travel/traverse as a deviation from the vehicle's predefined route to accommodate a requestor within the vehicle. For example, a vehicle plies on a route A→B→C with a total distance of 10 kms. A new requestor D may be accommodated between A and B or between B and C in the route. If the requestor D is to be accommodated between A and B, the vehicle may have to traverse an additional distance of 2 kms, while the vehicle may have to traverse an additional distance of 1 km if the requestor D is to be accommodated between B and C. Hence, in this case, the first additional distance may be determined as 1 km, such that the requestor D may be accommodated between B and C and the modified route may become A→B→D→C.

A "vehicle" refers to means of transportation, which may transport one or more individuals and/or cargo between two or more locations on a route. In an embodiment, a group of one or more individuals may share the vehicle.

"First set of nodes" refers to a set of nodes in a graph that are representative of one or more requestors.

"Second set of nodes" refers to a set of nodes in a graph that are representative of one or more vehicles.

A "graph" is representative of an association between the first set of nodes and the second set of nodes. Thus, the graph includes the first set of nodes interconnected to the second set of nodes. In an embodiment, the graph may correspond to a flow network with each of the first set of nodes being connected to a source node and each of the second set of nodes being connected to a sink node. Further, each edge may have an associated cost and an associated flow value in the flow network. In an embodiment, the cost associated with an edge between each of the first set of nodes and each of the second set of nodes may correspond to the additional distance traversable by a respective vehicle apart from predefined route to accommodate a respective requestor. In case the capacity of the one or more vehicles is fixed, the graph may further include a third set of nodes (as defined below) between the first set of nodes and the second set of nodes.

"Third set of nodes" refers a set of nodes in a graph that are a combination of nodes in the first set of nodes (i.e., the nodes representing the one or more requestors). For example, the first set of nodes includes nodes A, B, and C. The third set of nodes may include the nodes {A}, {B}, {C}, {A, B}, {B, C}, {C, A}, and {A, B, C}.

A "permutation" refers to a distinct arrangement of one or more items in a set. Thus, for a node, such as {A, B, C}, in the third set of nodes, there are six possible permutations of the node, i.e., {A, B, C}, {A, C, B}, {B, A, C}, {B, C, A}, {C, A, B}, and {C, B, A}. Hereinafter, the permutation has been interchangeably referred as an arrangement.

"Second additional distance" refers to a minimum extra distance that a vehicle may have to travel apart from the predefined route to accommodate an arrangement of requestors (arranged in a particular permutation) belonging to a node in the third set of nodes (where a node in the third set of nodes is a combination of one or more nodes from the first set of nodes). For example, the predefined route of a vehicle is A→B→C with a total distance of 12 kms. A node in the third set of nodes may represent requestors P and Q. For a given permutation of these requestors, say, P, followed by Q, the vehicle may have to take a deviation of 4 kms between A and B to accommodate the requestors P and Q in that order. On the other hand, the vehicle may have to take a deviation of 6 kms between B and C to accommodate the requestors P and Q in that order. Further, the distance between P and Q (i.e., the route P→Q) may be of 3 kms. Hence, in this case, the second additional distance may be determined as 7 kms (i.e., 4+3 km) such that the requestors P and Q may be accommodated in that order between A and B and the modified route may become A→P→Q→B→C.

"Capacity of a vehicle" refers to a maximum number of requestors that may be accommodated in a vehicle, when the vehicle is empty. In an embodiment, the capacity of a vehicle corresponds to a maximum number of permissible vacancies in the vehicle. Thus, the capacity of a vehicle may correspond to a total number of seats in the vehicle.

"Vacancy of a vehicle" refers to a number of empty seats in the vehicle. In an embodiment, the vacancy of a vehicle may correspond to a number of permissible allocations of requestors to the vehicle. For example, a vehicle has a capacity of eight passengers. If the number of passengers currently traveling in the vehicle is six, the vehicle may have a vacancy of two as the vehicle may accommodate two more passengers.

"Requestor" refers to an individual who wishes to avail a transport facility and commute by a vehicle. In an embodiment, the requestor may send a travel request using a computing device associated with the requestor.

"Route" refers a path which may be traversed be a vehicle to pickup/drop one or more requestors. In an embodiment, the path may include a set of locations in a predetermined order.

FIG. 1 is a block diagram of a system environment 100, in which various embodiments can be implemented. The system environment 100 includes an application server 102, a database server 104, a transport manager-computing device 106, a requestor-computing device 108, an operator-computing device 110 and a network 114.

The application server 102 refers to a computing device including one or more processors and one or more memories. The one or more memories may include computer readable code that is executable by the one or more processors to perform predetermined operation. In an embodiment, the predetermined operation may include recommending one or more vehicles commuting on a predefined route. In an embodiment, at a first time instance, the application server 102 may receive information pertaining to a travel request of a first set of requestors from the user-computing device 108. Alternatively, the application server 102 may receive the information pertaining to the travel requests from the requestor-computing device 108. The application server 102 may determine a predefined route for each of the one or more vehicles to accommodate the first set of requestors using an Integer Linear Programming (ILP) technique. The application server 102 may display the predefined routes of the one or more vehicles on the transport manager-computing device 106 through a user-interface. An example of the user-interface displaying the predefined routes of the one or more vehicles has been explained in conjunction with FIG. 7.

Thereafter, at a second time instance after the first time instance, the application server 102 may receive a cancellation request from some requestors out of the first set of requestors. In an embodiment, the transport manager-computing device 106 or the requestor-computing device 108 may provide the information pertaining to the cancellation request. In addition, at the second time instance, the application server 102 may receive one or more new travel requests from one or more new requestors. In an embodiment, the application server 102 may recommend the one or more vehicles to the one or more new requestors. For example, in case of an organization providing pick-up/drop facility to its employees, the employees who may avail such pick-up/drop facility may be predetermined at a beginning of a work shift (i.e., the first time instance). The application server 102 may receive information pertaining to a travel request of such employees from the transport manager-computing device 106. Thereafter, the application server 102 may determine the predefined route for each of the one or more vehicles to accommodate such employees. However, before an end of the work shift, e.g., an hour before the end of the work shift (i.e., the second time instance), the application server 102 may receive cancellation requests from one or more of employees. Further, the application server 102 may also receive fresh travel requests from the transport manager-computing device 106 before the end of the work shift. Such fresh travel requests may be related to one or more new employees who may not have earlier requested to avail the pick-up/drop facility.

In an embodiment, the application server 102 may relieve a set of vehicles from the one or more vehicles based on a number of vacancies in the one or more vehicles, a number of the one or more new requestors, and a capacity of each of the one or more vehicles. For example, the application server 102 may remove the vehicle from the one or more vehicles when a difference of the number of vacancies and the capacity is greater than or equal to the number of the one or more requestors. In an embodiment, the application server 102 may add a set of requestors, who were allocated to the removed vehicle, to a list of the one or more requestors, for allocation to remaining of the one or more vehicles.

Alternatively, in an embodiment, the application server 102 may add a vehicle to the one or more vehicles based on the number of vacancies in the one or more vehicles and the number of the one or more requestors. For example, the application server 102 may add the vehicle when the number of vacancies is less than the number of the one or more requestors. In an embodiment, the application server 102 may determine the predefined route for the newly added vehicle to accommodate a second set of requestors (to be accommodated in the new vehicle) from the one or more requestors using the ILP technique.

In an embodiment, the application server 102 may determine whether the capacity of each of the one or more vehicles is variable or fixed. In an embodiment, the capacity of the one or more vehicle may be determined as variable if the various vehicles do not have the same capacity. Alternatively, the capacity of the one or more vehicles may be determined as fixed if each vehicle has the same capacity. In a scenario where the capacity of the one or more vehicles is variable, the application server 102 may generate a graph G1 from the first set of nodes and the second set of nodes. The first set of nodes may be representative of the one or more requestors and the second set of nodes may be representative of the one or more vehicles. In an embodiment, the application server 102 may create a flow network F1 from the graph G1. An example of the flow network F1 has been explained in conjunction with FIG. 3 and FIG. 5. Thereafter, in an embodiment, for each requestor, the application server 102 may determine a first additional distance that each of the one or more vehicles has to traverse apart from the predefined route for the requestor. Further, the application server 102 may determine the mapping between the first set of nodes and the second set of nodes based on the first additional distance. In an embodiment, the application server 102 may use the min-cost max-flow algorithm on the flow network F1 to determine the mapping. The application server 102 may remove allocated requestors from the first set of nodes. Further, the application server 102 may remove vehicles from the second set of nodes, which have no vacancy left after the allocation of such requestors. The application server 102 may generate a second graph G1' from the modified first set of nodes and the modified second set of nodes and continue the allocation of the remaining requestors to the remaining vehicles in a similar manner until all requestors have been allocated.

In a scenario where the capacity of each of the one or more vehicles is fixed, in an embodiment, the application server 102 may generate a graph G2 comprising a first set of nodes, a second set of nodes, and a third set of nodes. The first set of nodes may be representative of the one or more requestors, the second set of nodes may be representative of the one or more vehicles, while each node in the third set of nodes may comprise a combination of nodes in the first set of nodes. Thereafter, the application server 102 may create a flow network F2 from the graph G2. An example of the flow network F2 has been explained in conjunction with FIG. 3 and FIG. 6. Thereafter, the application server 102 may determine a mapping between the first set of nodes and the second set of nodes based on the second additional distance. In an embodiment, the application server 102 may use a min-cost max-flow algorithm on the flow network F2 to determine the mapping.

Based on the mapping between the first set of nodes and the second set of nodes, the application server 102 may recommend the one or more vehicles, plying on the predefined routes, to the one or more requestors. In an embodiment, the application server 102 may modify the predefined route of each of the one or more vehicles to accommodate the respective requestors allocated to the vehicles. The application server 102 may present the recommendation of the one or more vehicles through a user-interface on the transport manager-computing device 106. Further, in an embodiment, the application server 102 may send a notification indicative of the recommendation to a computing device of the one or more requestors (e.g., the requestor-computing device 108). In addition, in an embodiment, the application server 102 may transmit the modified route to a computing device associated with each of the one or more vehicles (e.g., the operator-computing device 110). An example of a user-interface displayed on the transport manager-computing device 106 to present the recommendation of the one or more vehicles for the one or more requestors is explained in conjunction with FIG. 8. Further, an example of a user-interface displayed on the requestor-computing device 108 is explained in conjunction with FIG. 9, while an example of a user-interface displayed on the operator-computing device 110 is explained in conjunction with FIG. 10.

The application server 102 may be realized through various types of application servers such as, but not limited to, Java application server, .NET framework application server, and Base4 application server.

The database server 104 may refer to a device or a computer that stores at least travel requests received from the transport manager-computing device 106 and/or the requestor-computing device 108. Further, the database server 104 may store information pertaining to a map and distance of the various travel locations in a geographical area. In addition, the database server 104 may store information pertaining to the predefined route of the one or more vehicles and recommendations of the one or more vehicles determined for the one or more requestors. In an embodiment, the database server 104 may receive a query from the application server 102 to extract/update the information stored on the database server 104. The database server 104 may be realized through various technologies such as, but not limited to, Oracle®, IBM DB2®, Microsoft SQL Server®, Microsoft Access®, PostgreSQL®, MySQL® and SQLite®, and the like. In an embodiment, the application server 102 may connect to the database server 104 using one or more protocols such as, but not limited to, Open Database Connectivity (ODBC) protocol and Java Database Connectivity (JDBC) protocol.

A person with ordinary skill in the art would understand that the scope of the disclosure is not limited to the database server 104 as a separate entity. In an embodiment, the functionalities of the database server 104 can be integrated into the application server 102.

The transport manager-computing device 106 refers to a computing device including one or more processors and one or more memories. The one or more memories may include computer readable code that is executable by the one or more processors to perform predetermined operation. In an embodiment, the transport manager-computing device 106 may be used by a user who is an employee of an organization operating the one or more vehicles. Alternatively, the user of the transport manager-computing device 106 may be an employee of another organization, which provides consultation for managing the operations of a transportation agency operating the one or more vehicles. In an embodiment, the user of the transport manager-computing device 106 may use the transport manager-computing device 106 to provide inputs pertaining to travel requests of the first set of requestors at the first time instance (e.g., the beginning of a work shift). The transport manager-computing device 106 may transmit the information pertaining to the travel requests of the first set of requestors to the application server 102. As discussed, the application server 102 may determine the predefined routes for the one or more vehicles to accommodate the first set of requestors using the ILP technique. In an embodiment, the predefined routes of the one or more vehicles may be displayed through the user-interface of the transport manager-computing device 106. An example user-interface displaying the predefined routes of the one or more vehicles has been explained in conjunction with FIG. 7.

Further, at the second time instance (e.g., one hour before the end of the shift), the user of the transport manager-computing device 106 may provide inputs pertaining to the cancellation of a travel request of a requestor in the first set of requestors. The user may also provide inputs pertaining to fresh travel requests of the one or more new requestors (not belonging to the first set of requestors). The transport manager-computing device 106 may transmit the cancellation request and the travel requests pertaining to the one or more requestors to the application server 102. The application server 102 may recommend the one or more vehicles, plying on the predefined routes, for the one or more requestors. Further, the application server 102 may modify the predefined routes of the one or more vehicles to accommodate the respective requestors. In an embodiment, the transport manager-computing device 106 may display the recommendation of the one or more vehicles for the one or more requestors through a user-interface. An example user-interface displaying the recommendation of the one or more vehicles for the one or more requestors has been explained in conjunction with FIG. 8. By using the recommendations, the user of the transport manager-computing device 106 may prepare a travel roster and manage various travel related logistics. For example, the user may co-ordinate with operators of the one or more vehicles and inform them about the recommended route. Further, the user may send notifications to the one or more requestors about vehicles/routes recommended for such requestors.

The transport manager-computing device 106 may include a variety of computing devices such as, but not limited to, a laptop, a personal digital assistant (PDA), a tablet computer, a smartphone, a phablet, and the like.

A person skilled in the art will appreciate that the scope of the disclosure is not limited to the application server 102 and the transport manager-computing device 106 as separate entities. In an embodiment, the application server 102 may be realized as an application hosted on or running on the transport manager-computing device 106 without departing from the spirit of the disclosure.

The requestor-computing device 108 refers to a computing device including one or more processors and one or more memories. The one or more memories may include computer readable code that is executable by the one or more processors to perform predetermined operation. In an embodiment, the requestor-computing device 108 may be used by a requestor who wishes to travel by a vehicle. The requestor may provide inputs indicative of his/her travel schedule through the requestor-computing device 108. The requestor-computing device 108 may then transmit such inputs provided by the requestor as a travel request to the transport manager-computing device 106 and/or the application server 102. Through the requestor-computing device 108, the requestor may also cancel or edit a previous travel request of the requestor. In an embodiment, the requestor-computing device 108 may provide the requestor a notification indicative of the recommended vehicle for the requestor through a user-interface of the requestor-computing device 108. An example of a user-interface displaying the notification of the recommendation of vehicle for the requestor has been explained in conjunction with FIG. 9.

The requestor-computing device 108 may include a variety of computing devices such as, but not limited to, a laptop, a personal digital assistant (PDA), a tablet computer, a smartphone, a phablet, and the like.

The operator-computing device 110 refers to a computing device including one or more processors and one or more memories. The one or more memories may include computer readable code that is executable by the one or more processors to perform predetermined operation. In an embodiment, the operator-computing device 110 may be used by an operator of the vehicle. Examples of the operator include, but are not limited to, an individual driving the vehicle, an individual navigating the vehicle, or an individual coordinating the route of the vehicle. In an embodiment, the operator-computing device 110 may be installed within the vehicle. In an embodiment, the operator-computing device 110 may correspond to a navigation device with inbuilt GPS sensors. Further, the one or more memories of the operator-computing device 110 may store information pertaining to a map of a geographical area in which the vehicle plies. In an embodiment, the operator-computing device 110 may present the map of the geographical area with the predefined route on which the vehicle plies. In addition, in an embodiment, the operator-computing device 110 may display a notification indicative of a recommendation of requestors assigned to the vehicle through a user-interface. Further, the notification may include a recommended route for the vehicle. An example of a user-interface displaying the notification of the recommendation of requestors assigned to the vehicle has been explained in conjunction with FIG. 10.

The operator-computing device 110 may include a variety of computing devices such as, but not limited to, a laptop, a personal digital assistant (PDA), a tablet computer, a smartphone, a phablet, and the like.

The network 112 corresponds to a medium through which content and messages flow between various devices of the system environment 100 (e.g., the application server 102, the database server 104, the transport manager-computing device 106, the requestor-computing device 108, and the operator-computing device 110). Examples of the network 112 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
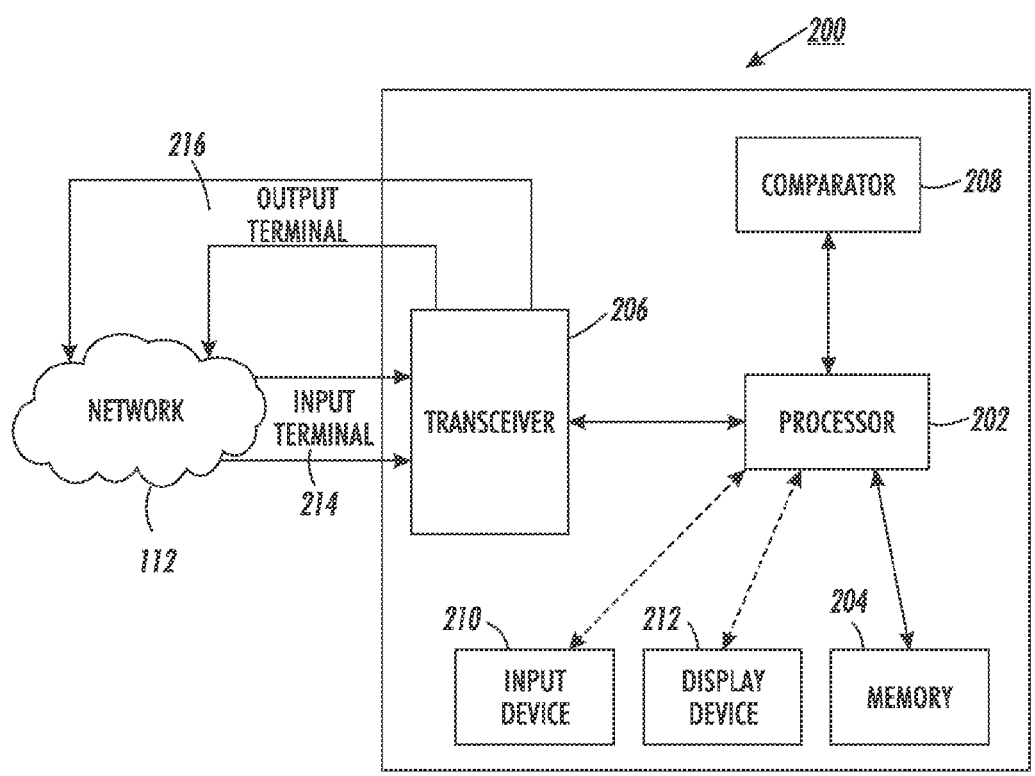
FIG. 2 is a block diagram that illustrates a system for recommending the one or more vehicles commuting on the predefined route, for the one or more requestors, in accordance with at least one embodiment.

FIG. 2 is a block diagram that illustrates a system 200 for recommending the one or more vehicles commuting on the predefined route, for the one or more requestors, in accordance with at least one embodiment. In an embodiment, the system 200 may correspond to the application server 102 or the transport manager-computing device 106. For the purpose of ongoing description, the system 200 is considered the application server 102. However, the scope of the disclosure should not be limited to the system 200 as the application server 102. The system 200 may also be realized as the transport manager-computing device 106, without departing from the spirit of the disclosure.

The system 200 includes a processor 202, a memory 204, a transceiver 206, a comparator 208, an input device 210, a display device 212, an input terminal 214, and an output terminal 216. The processor 202 is coupled to the memory 204, the transceiver 206, the comparator 208, the input device 210, and the display device 212. The transceiver 206 is connected to the network 112 through the input terminal 214 and the output terminal 216.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the system 200 to perform the predetermined operations.

The transceiver 206 receives and transmits messages and data from/to various components of the system environment 100 (e.g., the database server 104, the transport manager-computing device 106, the requestor-computing device 108, and the operator-computing device 110) over the network 112 through the input terminal 214 and the output terminal 216. Examples of the transceiver 206 may include, but are not limited to, an antenna, an Ethernet port, a USB port, or any other port that can be configured to receive and transmit data. The transceiver 206 receives and transmits data/messages in accordance with the various communication protocols, such as, TCP/IP, UDP, and 2G, 3G, or 4G communication protocols through the input terminal 214 and the output terminal 216, respectively.

The comparator 208 is configured to compare at least two input signals to generate an output signal. In an embodiment, the output signal may correspond to either "1" or "0." In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 1, a person skilled in the art will appreciate that the comparator 208 may be implemented within the processor 202 without departing from the scope of the disclosure.

The input device 210 may comprise suitable logic, circuitry, interfaces, and/or code that may be operable to receive an input from the user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

The display device 212 may comprise suitable logic, circuitry, interfaces, and/or code that may be operable to render a display. In an embodiment, the display device 212 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 212 may be capable of receiving input from the user. In such a scenario, the display device 212 may be a touch screen that enables the user to provide input. In an embodiment, the touch screen may correspond to at least one of a resistive touch screen, capacitive touch screen, or a thermal touch screen. In an embodiment, the display device 212 may receive input through a virtual keypad, a stylus, a gesture, and/or touch based input.

An embodiment of the operation of the system 200 for recommending the one or more vehicles commuting on the predefined route, for the one or more requestors has been explained further in conjunction with FIG. 3.

Figure 3A:
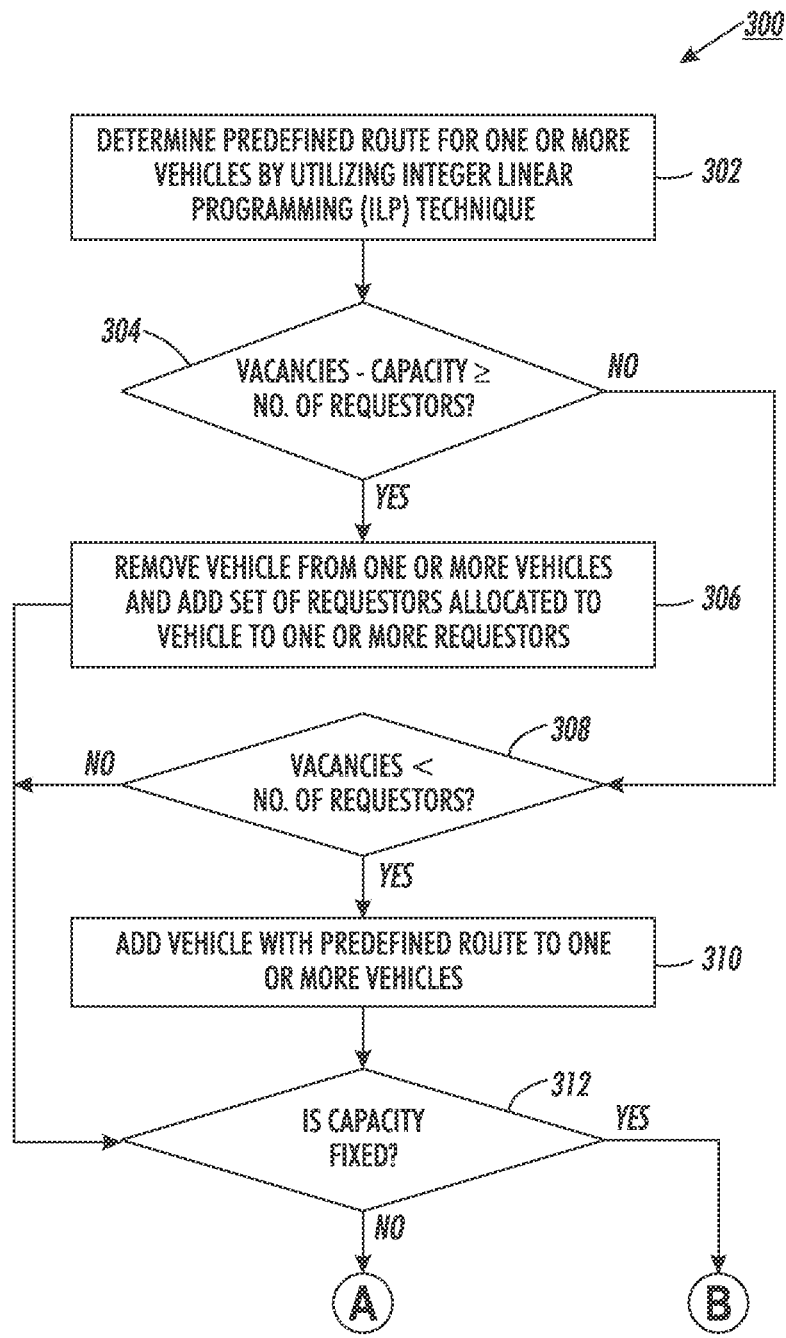
FIGS. 3A, 3B, and 3C depict a flowchart illustrating a method for recommending the one or more vehicles commuting on the predefined route, for the one or more requestors, in accordance with at least one embodiment.
Figure 3B:
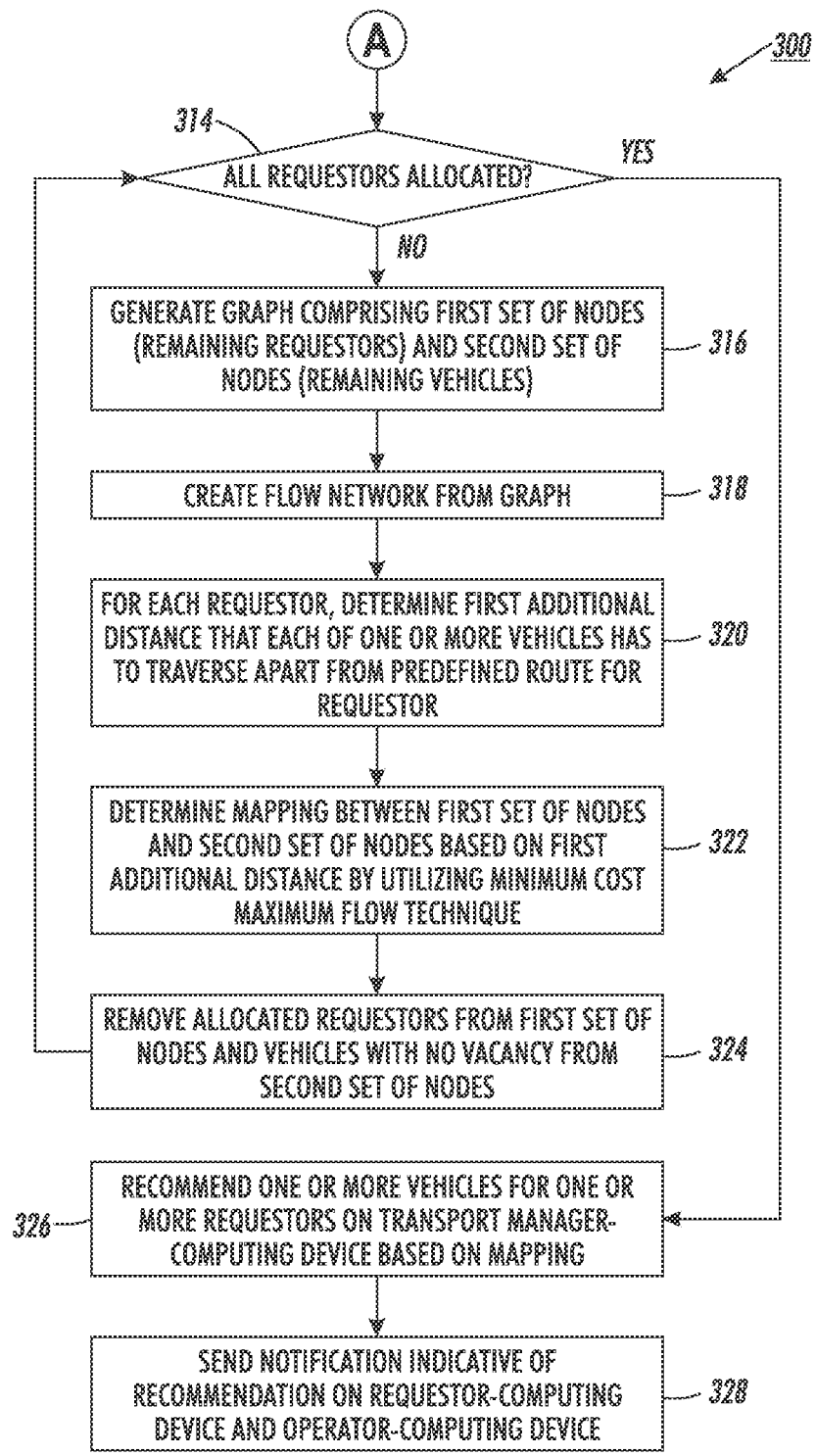
Figure 3C:
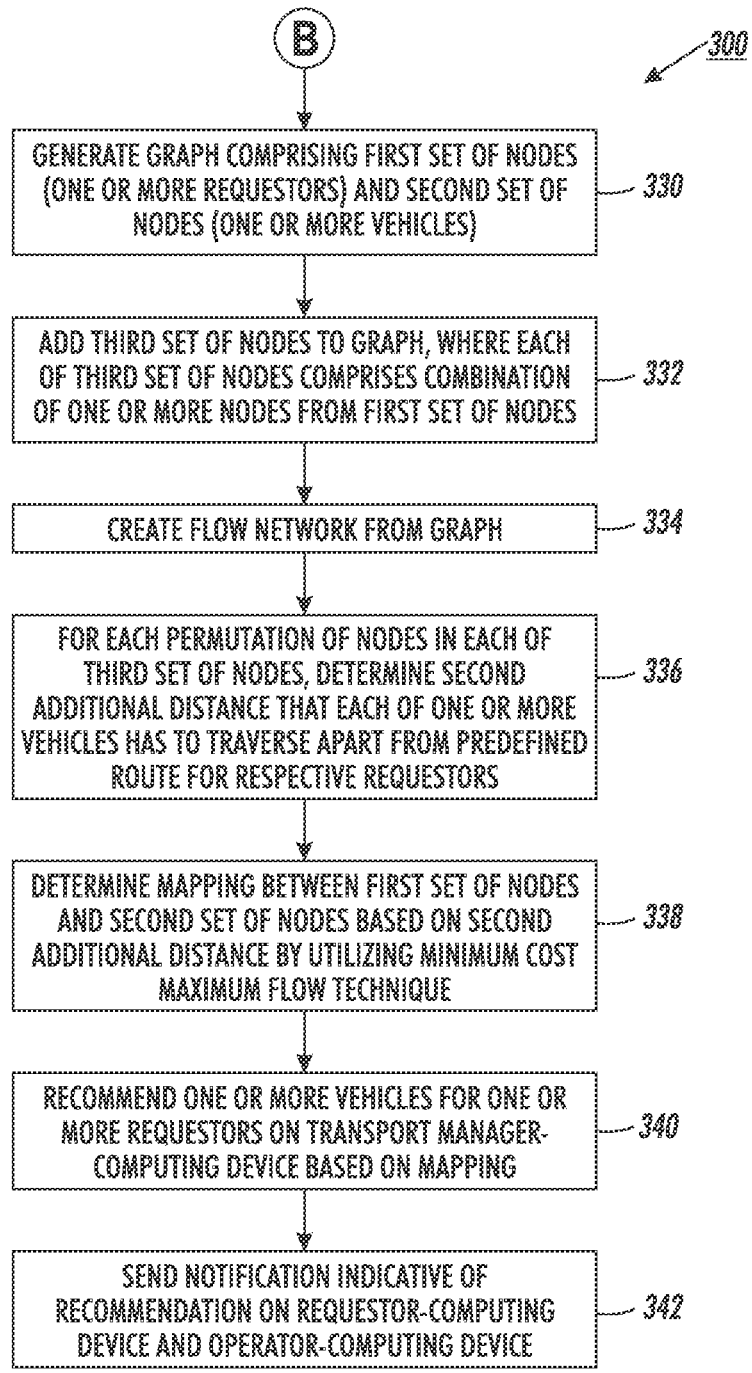

FIGS. 3A, 3B, and 3C depict a flowchart 300 illustrating a method for recommending the one or more vehicles commuting on the predefined route, for the one or more requestors, in accordance with at least one embodiment. The flowchart 300 has been described in conjunction with FIG. 1, FIG. 2, FIG. 4, FIG. 5, and FIG. 6.

At step 302, the predefined route for the one or more vehicles is determined. In an embodiment, the processor 202 is configured to determine the predefined route for the one or more vehicles using the ILP technique. At the first time instance, in an embodiment, the processor 202 may receive the information pertaining to the travel requests of the first set of requestors from the transport manager-computing device 106. Alternatively, the processor 202 may receive such information at the first time instance from the requestor-computing device 108 of the respective requestors in the first set of requestors. In an embodiment, the information pertaining to each travel request may include a travel schedule and a source/destination travel location of a respective requestor. For example, the travel schedule of a requestor may include an expected pick-up time from the source travel location and/or an expected drop time at the destination travel location. In an embodiment, the first set of requestors may have a common source travel location, i.e., each requestor may require to be picked up from a common location. For example, the first set of requestors may correspond to employees of an organization who need to be dropped at their residences after work. In such a scenario, the first set of requestors may have a common source travel location, i.e., a location of work at the organization. Alternatively, the first set of requestors may have a common destination travel location, i.e., each requestor may require to be dropped at a common location. For example, the first set of requestors may correspond to individuals availing carpooling services to a destination (e.g., an airport, a railway station, etc.). In the aforementioned scenario, the first set of requestors may have a common destination travel location (e.g., an airport, a railway station, etc.). In an embodiment, the processor 202 may store the information pertaining to the travel requests of the first set of requestors in the database server 104.

The scenario in which the first set of requestors have a common source travel location has been considered for the purpose of the ongoing disclosure. However, a person skilled in the art will appreciate that the scope of the disclosure should not be limited to such scenario. The disclosure may be implemented in a similar manner for the scenario in which the first set of requestors have a common destination travel location without departing from the spirit of the disclosure.

After receiving the information pertaining to the travel requests of the first set of requestors, in an embodiment, the processor 202 may generate a graph G representing the various locations of travel. The graph G may comprise a set of vertices V including a vertex representing the common source travel location and one or more vertices representing the destination travel locations of the first set of requestors. The graph G has been explained in conjunction with FIG. 4.

Figure 4:
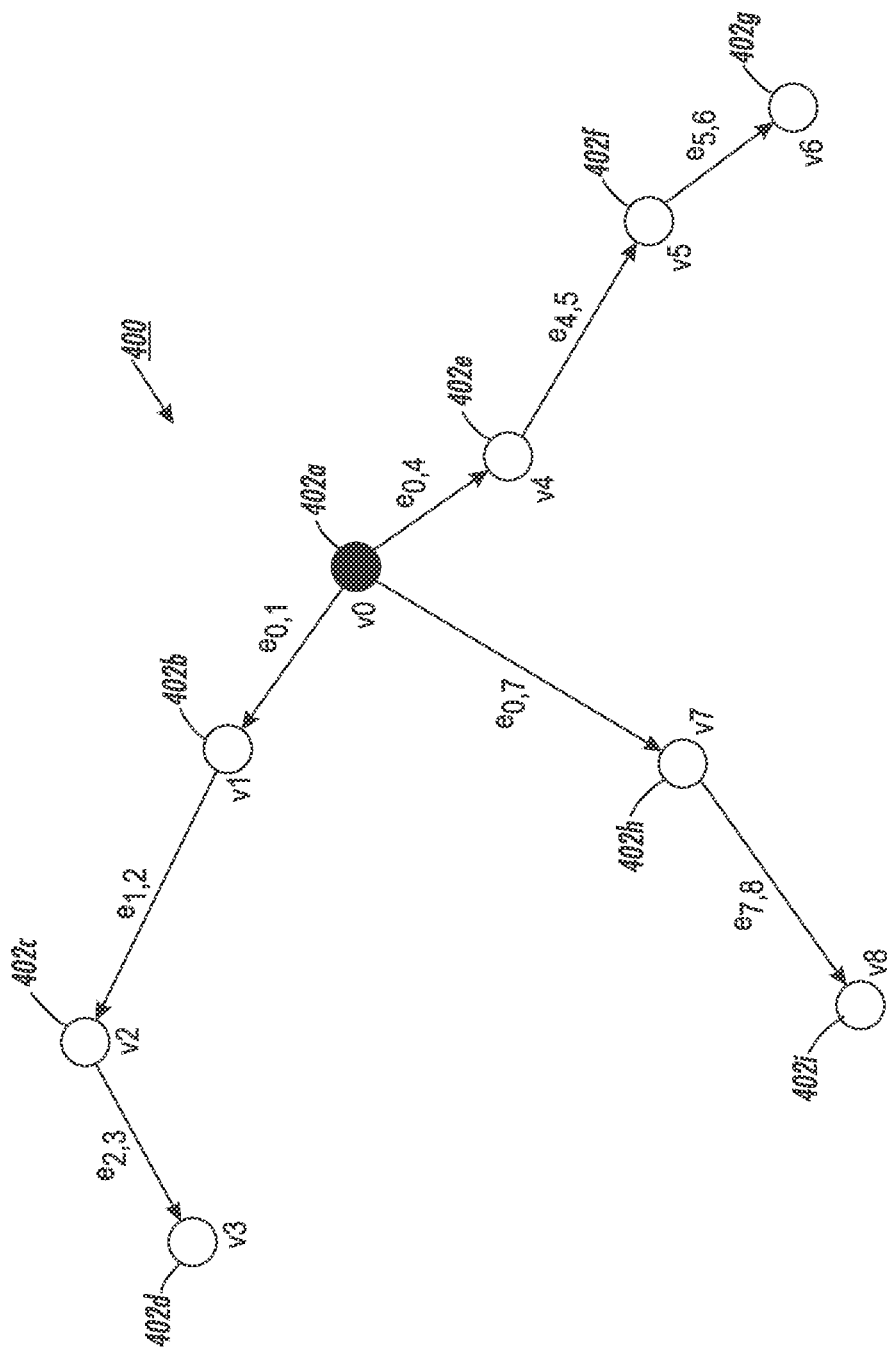
FIG. 4 illustrates an example of a graph representing various locations of travel in a geographical area in which one or more vehicles ply, in accordance with at least one embodiment.

FIG. 4 illustrates an example of the graph G (denoted by 400), which is generated at step 302, representing the various locations of travel in a geographical area in which the one or more vehicles ply, in accordance with at least one embodiment.

Referring to FIG. 4, each vertex in the graph 400 represents a location of travel in the geographical area in which the one or more vehicles ply. For example, a vertex v0 (depicted by 402a) may represent the common source location, while vertices v1 (depicted by 402b), v2 (depicted by 402c), v3 (depicted by 402d), v4 (depicted by 402e), v5 (depicted by 402f), v6 (depicted by 402g), v7 (depicted by 402h), and v8 (depicted by 402i) may represent the various destination locations. Further, a path between a pair of locations may be represented as an edge between the vertices representing the respective locations in the graph 400. For example, an edge $e_{0,1}$ represents a path between the locations represented by the vertices v0 (depicted by 402a) and v1 (depicted by 402b).

In an embodiment, the processor 202 may assign a weight $w_e$ to each edge $e_{ij}$ between vertices $v_i$ and $v_j$ in the graph G. In an embodiment, the weight $w_e$ between each edge $e_{ij}$ may be representative of a minimum distance $d_{ij}$ between the locations represented by respective vertices $v_i$ and $v_j$. In an embodiment, the processor 202 may determine the weight $w_e$ using a Floyd-Warshall's algorithm. Thereafter, the processor 202 may formulate an ILP problem using the following conditions:

$$\min \Sigma_{e \in E} \Sigma_{j \in \{1, \ldots m\}} \Sigma_{k=1}^{C} y_{e,j,k} \cdot w_e \quad (1)$$

$$\text{such that } \Sigma_{e \in E} \Sigma_{j \in \{1, \ldots m\}} \Sigma_{k=1}^{C} y_{e,j,k} = n \quad (2)$$

$$\text{and } \Sigma_{j \in \{1, \ldots m\}} \Sigma_{k=1}^{C} y_{e,j,k} \leq 1 \, \forall e \in E \quad (3)$$

$$\text{and } \Sigma_{e \in E} y_{e,j,k} \leq 1 \, \forall j \in \{1, \ldots, m\}, k \in \{1, \ldots C\} \quad (4)$$

$$\text{and } \Sigma_{e=(0,*)} \Sigma_{j \in \{1, \ldots m\}} y_{e,j,1} = m \quad (5)$$

$$\Sigma_{e=(*,u)} y_{e,j,k} \geq \Sigma_{e'=(u,v)} y_{e',j,k+1} \forall j \in \{1, \ldots m\},$$
$$u \in \{1, \ldots n\}, k \in \{1, \ldots C-1\} \quad (6)$$

$$\Sigma_{j \in \{1, \ldots m\}} \Sigma_{k=1}^{C} \Sigma_{e=(*,u)} y_{e,j,k} = 1 \, \forall u \in \{1, \ldots n\} \quad (7)$$

$$\Sigma_{j \in \{1, \ldots m\}} \Sigma_{k=1}^{C} \Sigma_{e=(v,*)} y_{e,j,k} = 1 \, \forall v \in \{1, \ldots n\} \quad (8)$$

$$y_{e,j,k} \in \{0,1\} \forall e \in E, j \in \{1, \ldots m\}, k \in \{1, \ldots C\} \quad (9)$$

where,

C: a capacity of each vehicle;

n: a number of requestors in the first set of requestors;

m: a number of one or more vehicles required to accommodate the first set of requestors, where m=⌈n/C⌉;

e: an edge (from the set of edges E in the graph G) forming a part of a route connecting two locations;

j: the predefined route being formulated for a $j^{th}$ vehicle;

$w_e$: weight of an edge e, i.e., the minimum distance between the two locations represented by the edge; and $y_{e,j,k}$: a matrix representative of edge e being in the $k^{th}$ position in the $j^{th}$ route.

The aforementioned conditions of the ILP problem are explained in conjunction with the graph 400 of FIG. 4. The ILP problem is represented in the equation 1, while the various constraints to the ILP problem are represented in the equations 2-9. In an embodiment, an aim of the ILP problem (equation 1) is to accommodate the first set of requestors in one or more routes (i.e., m routes) in such a manner that the total distance traversable by the one or more vehicles on the one or more routes is minimized. The constraint represented in equation 2 specifies that the total number of requestors that can be accommodated in the one or more vehicles is equal to 'n', i.e., the number of requestors in the first set of requestors. The constraint of equation 3 specifies that an edge may occur only once in any one route, over all the one or more routes. For example, consider the edge $e_{1,2}$ between the vertices v1 (depicted by 402b) and v2 (depicted by 402c) in the graph 400 of FIG. 4. The edge $e_{1,2}$ may occur once in any one of the one or more routes. Thus, the locations represented by vertices v1 (depicted by 402b) and v2 (depicted by 402c) may not be visited more than once in a route. The equation 4 specifies the constraint that the only one edge can occur in any position in a route. The equation 5 specifies the constraint that for every route, there must be edges leading away from the vertex representing the source travel location. Thus, a solution of the ILP must choose 'm' edges leading out of the vertex representing the source travel location for the one or more routes of the solution. For example, referring to the graph 400 of FIG. 4, the solution of the ILP may include three (if m=3) edges leading away from the vertex v0 (depicted by 402a) (i.e., the vertex representing the source location) for the one or more routes. The equation 6 specifies the constraint that the routes should be continuous. Accordingly, for any route, an edge e=(u,v) leading out of a vertex u may be chosen in the $k^{th}$ position of the route only if there is an edge incident on u chosen in the $(k-1)^{th}$ position of the route. Thus, u may correspond to the $(k-1)^{th}$ destination travel location in the route and v may correspond to the $k^{th}$ destination travel location in the route. For example, referring to the graph 400 of FIG. 4, the edge $e_{5,6}$ that leads out of the vertex v5 (depicted by 402f) may be chosen in the $k^{th}$ position of a route only if the edge $e_{4,5}$ is incident towards the vertex v5 (depicted by 402f) in the $(k-1)^{th}$ position in the route. Thus, the edge $e_{5,6}$ may be present between the vertices v5 (depicted by 402f) and v6 (depicted by 402g) in the route only if the vertex v5 (depicted by 402f) is connected to the previous vertex in the route (i.e., the vertex v4, depicted by 402e), thereby ensuring continuity of the route. Further, the equation 7 specifies the constraint that a vertex (i.e., a destination travel location) may be included in at most one route. Thus, at most one edge leading to the vertex may be included over all positions and over all routes. Similar to the equation 7, the equation 8 specifies the constraint that there may be at most one edge leading out of a vertex over all positions and over all routes. The equation 9 specifies that the matrix $y_{e,j,k}$ is a binary indicator of variables. A value of '1' of $y_{e,j,k}$ (for a particular value of e, j and k) is indicative of a presence of an edge e at the $k^{th}$ position in the $j^{th}$ route. Thus, the solution of the ILP problem may be obtained as the value of the matrix $y_{e,k,j}$. The value of '1' of $y_{e,j,k}$ for a particular value of e, j, and k may be indicative of the $j^{th}$ route including an edge 'e' (between locations such as $v_i$ and $v_{i+1}$) at the $k^{th}$ position of the route. Thus, the requestors who are to be dropped at the locations $v_i$ and $v_{i+1}$ may be accommodated in the vehicle plying on the $j^{th}$ route.

In an embodiment, the processor 202 may determine a solution for the ILP problem specified by the equation 1 subject to the constraints of equations 2-9 using any ILP solving technique known in the art. The solution to the ILP problem may be deterministic of the predefined route for each of the one or more vehicles for accommodating the first set of requestors. In an embodiment, the processor 202 may store the predefined route for each of the one or more vehicles in the database server 104. In an embodiment, the processor 202 may present the predefined routes of the one or more vehicles on the transport manager-computing device 106. An example user-interface presenting the predefined routes of the one or more vehicles on the transport manager-computing device 106 has been explained in conjunction with FIG. 4.

Thereafter, at the second time instance after the first time instance, the processor 202 may receive a cancellation request pertaining to a requestor within the first set of requestors from the transport manager-computing device 106 and/or the requestor-computing device 108. The processor 202 may remove the requestor associated with the cancellation request from the route associated with such requestor. For example, the route associated with the requestor to be removed is represented as R1={A0, A1, A2, A3, A4}, where A0 is the source travel location, A1-A4 are the destination travel locations of the requestors allocated to the route R1. If the destination travel location of the requestor to be removed is A2, the route R1 may be modified as R1'={A0, A1, A3, A4}. Thus, the edges between the vertices A1 and A2 may be deleted. Similarly, the edges between the vertices A2 and A3 may be deleted. Further, the vertices A1 and A3 may be joined by an edge. A person skilled in the art will appreciate that in a scenario where a route includes a single requestor and the requestor is to be deleted, the processor 202 may cancel the route and remove the vehicle corresponding to such a route from the one or more vehicles.

In addition, at the second time instance, the processor 202 may receive one or more travel requests pertaining to one or more requestors from the transport manager-computing device 106 and/or the requestor-computing device 108. In an embodiment, the one or more requestors may not belong to the first set of requestors. The processor 202 may recommend the one or more vehicles for the one or more requestors based on the vacancies in the one or more vehicles, as described next.

At step 304, a check is performed to determine whether a difference between the vacancies in the one or more vehicles and the capacity of a vehicle from the one or more vehicles is greater than or equal to a number of the one or more requestors. In an embodiment, the processor 202 is configured to perform the check. In an embodiment, the processor 202 may utilize the comparator 208 to compare the difference of the vacancies and the capacity with the number of the one or more requestors. If the processor 202 determines that the difference is greater than or equal to the number of the one or more requestors, the processor 202 performs step 306. Otherwise, the processor 202 performs step 308. For example, the total vacancy in the one or more vehicles is 30, the capacity of each vehicle is 5, and the number of requestors is 23. In such a scenario, the difference is greater than the number of requestors (as 30–5>23). Hence, the step 306 is performed.

At step 306, the vehicle is removed from the one or more vehicles and the set of requestors allocated to the vehicle are added to the one or more requestors. In an embodiment, if at the step 304 the processor 202 determines that the difference of the vacancies in the one or more vehicles and the capacity of a vehicle V' is greater than or equal to the number of the one or more requestors, the processor 202 may remove the vehicle V' from the one or more vehicles.

In an embodiment, the processor 202 may sort the one or more vehicles in an increasing order of the number of requestors currently allocated to the one or more vehicles. If the processor 202 determines at the step 304 that the difference is greater than or equal to the number of the one or more requestors, the processor 202 may remove the vehicle with the least number of allocated requestors from the one or more vehicles. However, in case two or more vehicles have the least number of allocated requestors at the same time, such ties may be broken based on a length of the routes of each such vehicle. In an embodiment, the processor 202 may remove the vehicle with a longer route in case of the two or more vehicles having the same number of allocated requestors. Thereafter, the processor 202 may again perform the check of the step 304 and remove the next vehicle from the sorted list of the one or more vehicles based on the difference and the number of the one or more requestors. Though not shown in FIG. 3A, the steps 304 and 306 may be iterated until the condition of step 304 evaluates to false.

At step 308, a check is performed to determine whether a total number of vacancies across all vehicles is less than the number of the one or more requestors. In an embodiment, the processor 202 is configured to perform the check. In an embodiment, the processor 202 may utilize the comparator 208 to compare the number of vacancies with the number of the one or more requestors. If the processor 202 determines that the total number of vacancies in the one or more vehicles is less than the number of the one or more requestors, the processor 202 may perform step 310. Otherwise, the processor 202 may perform step 312.

At step 310, a vehicle with a predefined route is added to the one or more vehicles. In an embodiment, if at step 308 the processor 202 determines that the number of vacancies in the one or more vehicles is less than the number of the one or more requestors, the processor 202 is configured to add the vehicle with the predefined route to the one or more vehicles. In an embodiment, the processor 202 may determine the predefined route of the new vehicle accommodating C requestors from the one or more requestors (where C is the capacity of the newly added vehicle) by utilizing the ILP technique, in a manner similar to that described in step 302. Thereafter, the processor 202 may remove the C requestors (who have been allocated to the newly added vehicle) from the one or more requestors.

At step 312, a check is performed to determine whether the capacity of the one or more vehicles is fixed or variable. In an embodiment, the processor 202 is configured to perform the check. In an embodiment, the capacity of the one or more vehicle may be determined as variable if the various vehicles do not have the same capacity. Alternatively, the capacity of the one or more vehicles may be determined as fixed if each vehicle has the same capacity. If the processor 202 determines that the capacity of the one or more vehicles is variable, the processor 202 performs steps 314 through 328. Otherwise, if the processor 202 determines the capacity of the one or more vehicles is fixed, the processor 202 performs steps 330 through 342.

Referring to FIG. 3B, at step 314, a check is performed to determine whether each of the one or more requestors has been allocated to a vehicle from the one or more vehicles. In an embodiment, the processor 202 is configured to perform the check. If the processor 202 determines that not all requestors have been allocated a vehicle, the processor 202 performs step 316. Otherwise, the processor 202 performs step 326.

At step 316, a graph G1 including the first set of nodes and the second set of nodes is generated. In an embodiment, the processor 202 is configured to generate the graph G1 from the first set of nodes and the second set of nodes. In an embodiment, the first set of nodes may be representative of the one or more requestors, while the second set of nodes may be representative of the one or more vehicles. In an embodiment, the graph G1 may correspond to a bipartite graph in which each node in the first set of nodes is connected to each node in the second set of nodes.

At step 318, a flow network F1 is created from the graph G1. In an embodiment, the processor 202 is configured to create the flow network F1 from the graph G1 created at step 316. To create the flow network F1, in an embodiment, the processor 202 may create a source node and a sink node such that nodes in the flow network F1 originate from the source node and terminate at the sink node. Thereafter, the processor 202 may connect each node in the first set of nodes to the source node. Further, the processor 202 may connect each node in the second set of nodes to the sink node. In an embodiment, the processor 202 may assign each edge in the flow network F1 a cost value and a flow value. For example, the processor 202 may assign the edges between the source node and the nodes in the first set of nodes a cost value of 0 as nodes originating from the source node in a flow network may not have any associated cost. Further, the processor 202 may assign each edge between the source node and the nodes in the first set of nodes a flow value of 1 as each node in the first set of nodes may have a cardinality of one. An example of the flow network F1 has been explained in conjunction with FIG. 5.

Figure 5:
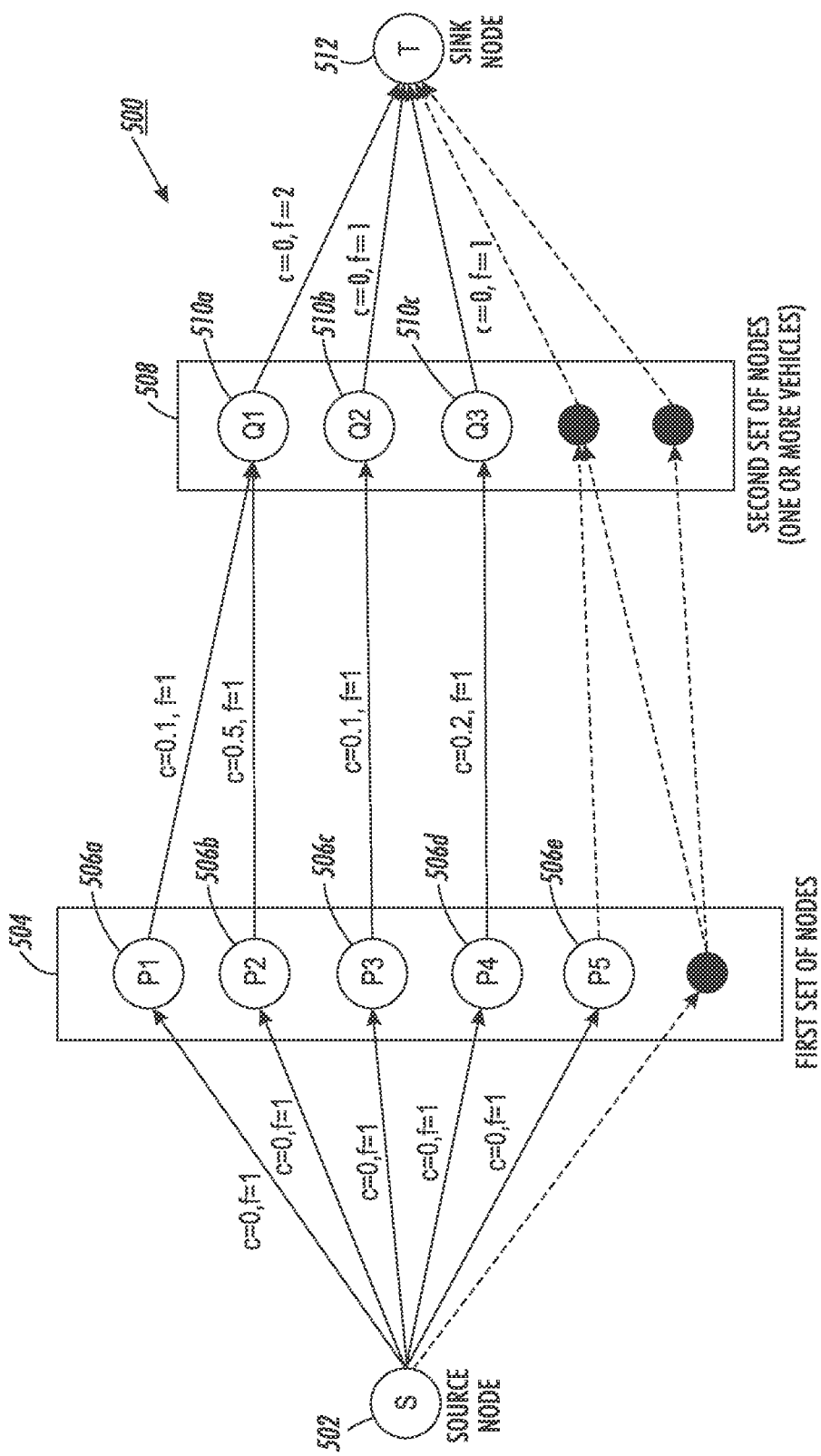
FIG. 5 Illustrates an example of a flow network, which may be created in case of one or more vehicles having variable capacity, in accordance with at least one embodiment.

FIG. 5. Illustrates an example of the flow network 500, which may be created in case of the one or more vehicles having variable capacity (created at the step 318), in accordance with at least one embodiment.

Referring to FIG. 5, the flow network 500 includes the source node S 502, the first set of nodes (representing the one or more requestors) 504, the second set of nodes (representing the one or more vehicles) 508, and the sink node T 512. The source node S 502 is connected to nodes in the first set of nodes 504 such as a node P1 506a, a node P2 506b, a node P3 506c, and so on. Further, each such connection has a cost value of 0 and a flow value of 1. As shown in FIG. 5, the nodes in the first set of nodes 504 are connected to nodes in the second set of nodes 508. For instance, the node P1 506a (belonging to the first set of nodes 504) is connected to the node Q1 510a of the second set of nodes 508. Further, the nodes P2 506b and P3 506c are connected to the nodes Q1 510a and Q2 510b, respectively. Though not shown in FIG. 5, a person skilled in the art will understand that each node in the first set of nodes 504 may be connected to each node in the second set of nodes 508 in the flow network 500. The flow values of each such edge is 1. The determination of the cost value of the edges between the first set of nodes 508 and the second set of nodes 512 has been explained in step 320. Further, each node in the second set of nodes 512 is connected to the sink node T 512. The cost value of such connections is 0, while the flow value is determined using a min-cost max-flow algorithm, as discussed in step 322.

Referring to FIG. 3B, at step 320, the first additional distance traversable by each of the one or more vehicles apart the predefined route is determined. In an embodiment, the processor 202 is configured to determine the first additional distance. For each of the one or more requestors, the processor 202 may determine the first additional distance that each of the one or more vehicles has to traverse apart from the predefined route to accommodate the respective requestors. The processor 202 may use the following equation to determine the first additional distance:

$$d(p,r) = \min_{0 \leq i < k}(d(r_i, p) + d(p, r_{i+1}) - d(r_i, r_{i+1})) \quad (10)$$

where, $r_i$: $i^{th}$ drop location on the predefined route 'r';

k: current number of passengers traveling in route r;

d(p,r): the first additional distance (i.e., minimum distance that the vehicle of route r has to travel to accommodate a requestor p);

$d(r_i, p)$: distance between the $i^{th}$ drop location on the predefined route r and the drop location of the requestor p;

$d(p, r_{i+1})$: distance between the drop location of the requestor p and the $(i+1)^{th}$ drop location on the predefined route r; and $d(r_i, r_{i+1})$: distance between the $i^{th}$ and the $(i+1)^{th}$ drop locations in the predefined route r.

A person skilled in the art will appreciate that the processor 202 may determine the values of the various distances in the above equation 10 using a Floyd-Warshall's algorithm on the graph G, which represents various locations of travel (refer step 302).

As is evident from equation 10, the first additional distance may correspond to a minimum deviation that may be required on the route r to accommodate the requestor p. In an embodiment, the processor 202 may assign the first additional distance as a cost value between the connections of the respective nodes in the first set of nodes and the second set of nodes in the flow network F1.

Referring to the example flow network 500 of FIG. 5, the nodes in the first set of nodes 504 are connected to the nodes in the second set of nodes 508. As discussed above, the flow values of such connections are 1. In an embodiment, the processor 202 may assign the first additional distance d(p,r) (determined using equation 12) as the cost value associated with the connection between the node p in the first set of nodes and a node r in the second set of nodes (representing the predefined route of a vehicle). For instance, the processor 202 assigns a cost value of 0.5 to the connection between the node P2 506b and the node Q1 510a if the processor 202 determines the first additional distance as 0.5 units for the requestor P2 to be accommodated in the route Q1.

Referring to FIG. 3B, at step 322, a mapping between the first set of nodes and the second set of nodes is determined. In an embodiment, the processor 202 is configured to determine the mapping between the first set of nodes and the second set of nodes based on the first additional distance determined at step 320. In an embodiment, the processor 202 may use a min-cost max-flow algorithm to determine the mapping in the flow network F1. For example, the processor 202 may use the min-cost max-flow algorithm such as a Klein algorithm to determine the mapping based on the first additional distance, subject to the constraint that a total flow value at the sink node is equal to a minimum of the values of the number of requestors and the number of vehicles.

Referring to the example flow network 500 of FIG. 5, the processor 202 may determine the mapping between the first set of nodes 504 and the second set of nodes 508 using the min-cost max-flow algorithm. For instance, the processor 202 may determine the mapping as an allocation of the requestor P3 to the vehicle Q2, as the nodes P3 506c is connected to the node Q2 510b and the total flow from the node Q2 510b to the sink node T 512 is 1. A person skilled in the art will appreciate that multiple solutions may be possible for the same set of requestors and the same set of vehicles without departing from the spirit of the disclosure.

Referring to FIG. 3B, at step 324, requestors allocated to vehicles are removed from the one or more requestors and vehicles with no vacancy are removed from the one or more vehicles. In an embodiment, the processor 202 is configured to check which of the one or more requestors have been allocated to a vehicle from the one or more vehicles. Further, the processor 202 is configured to determine which of the one or more vehicles have no vacancy left due to allocation of requestors. Thereafter, the processor 202 may remove the requestors allocated to a vehicle, from the one or more requestors. Thus, the processor 202 may modify the first set of nodes by removing such requestors from the first set of nodes. Further, the processor 202 may remove the vehicles with no vacancy from the one or more vehicles. The processor 202 may modify the second set of nodes by removing such vehicles from the second set of nodes.

After step 324, the processor 202 performs the step 314 to check whether all requestors have been allocated to the one or more vehicles. If each of the one or more requestors have not been allocated to the one or more vehicles, the processor 202 iterates the steps 316 through 324 by creating a modified graph (hereinafter referred as second graph, G1') based on the modified first set of nodes and the modified second set of nodes. Otherwise, if at the step 314 the processor 202 determine that all the requestors have been allocated to the one or more vehicles, the processor 202 performs step 326.

At step 326, the one or more vehicles are recommended for the one or more requestors based on the mapping. In an embodiment, the processor 202 is configured to recommend the one or more vehicles for the one or more requestors based on the mapping. In an embodiment, the processor 202 may recommend the one or more vehicles for the one or more requestors on respective computing devices of the one or more requestors. For example, the processor 202 may recommend the vehicle Q2 for the requestors P3 (as shown in FIG. 5). In an embodiment, the processor 202 may update the predefined routes of the one or more vehicles based on the mapping to accommodate the one or more requestors. For example, based on the first additional distance, the processor 202 may determine that the requestor P3 may be dropped off between the $i^{th}$ and the $(i+1)^{th}$ drop locations of the route of the vehicle Q2. The processor 202 may accordingly update the route of the vehicle Q2 to accommodate the requestor P3 between the previous $i^{th}$ and $(i+1)^{th}$ drop locations. In an embodiment, the processor 202 may recommend the one or more vehicles for the one or more requestors on the transport manager-computing device 106. An example of a user-interface presenting the recommendation of the one or more vehicles for the one or more requestors has been explained in conjunction with FIG. 8.

At step 328, a notification indicative of the recommendation is sent. In an embodiment, the processor 202 is configured to send the notification indicative of the recommendation. In an embodiment, the processor 202 may send the notification to computing devices installed on the one or more vehicles (e.g., the operator-computing device 110), computing devices of the one or more requestors (e.g., the requestor-computing device 108), and/or computing devices used by one or more individuals managing a scheduling of the one or more vehicles (e.g., the transport manager-computing device 106). Examples of the notifications include, but are not limited to, a short messaging service (SMS) message, an email message, a multimedia message, or any other message. An example of a user-interface presenting the notification indicative of the recommendation has been explained in conjunction with FIG. 9 and FIG. 10.

Referring to FIG. 3C, at step 330, a graph G2 including the first set of nodes and the second set of nodes is generated. In an embodiment, the processor 202 is configured to generate the graph G2 from the first set of nodes and the second set of nodes. The first set of nodes may be representative of the one or more requestors, while the second set of nodes may be representative of the one or more vehicles. In an embodiment, the processor 202 may generate the graph G2 as a bipartite graph of the first set of nodes and the second set of nodes.

At step 332, the third set of nodes may be added to the graph G2. In an embodiment, the processor 202 is configured to add the third set of nodes in the graph G2 generated at step 330. In an embodiment, the third set of nodes may include a combination of one or more nodes from the first set of nodes. For example, the first set of nodes includes nodes A, B, and C. In such a scenario, the third set of nodes may include nodes such as {A}, {B}, {C}, {A, B}, {A, C}, {B, C}, and {A, B, C}. In an embodiment, the processor 202 may add the third set of nodes between the first set of nodes and the second set of nodes in the graph G2. The processor 202 may add the third set of nodes in the graph G2 as the one or more vehicles may have more than one vacancy each. Hence, more than one requestors may simultaneously be allocated to such vehicles. The third set of nodes may include various combinations of the nodes in the first set of nodes such that the processor 202 may allocate a combination of requestors to the one or more vehicles. In an embodiment, to add the third set of nodes in the graph G2, the processor 202 connects the respective nodes of the first set of nodes to the nodes in the third set of nodes. For example, the processor 202 may connect a node "A" in the first set of nodes to the nodes "{A}," "{A, B}," "{A, C}," and "{A, B, C}" of the third set of nodes. Similarly, the processor 202 may connect a node "B" in the first set of nodes to the nodes "{B}," "{A, B}," "{B, C}," and "{A, B, C}" of the third set of nodes, and so on. Thereafter, the processor 202 may connect each node in the second set of nodes with each node in the third set of nodes. Thus, the third set of nodes may form an intermediate layer of nodes in the graph G2, while the first set of nodes and the second set of nodes may be indirectly connected through the third set of nodes.

At step 334, a flow network F2 is created from the graph G2. In an embodiment, the processor 202 is configured to create the flow network F2 from the graph G2 in which the third set of nodes have been added (at step 332). To create the flow network F2, in an embodiment, the processor 202 may create a source node and a sink node such that nodes in the flow network F2 originate from the source node and terminate at the sink node. Thereafter, the processor 202 may connect each node in the first set of nodes with the source node. Further, the processor 202 may connect each node in the second set of nodes with the sink node. The processor 202 may assign each edge in the flow network F2 a cost value and a flow value. For example, the processor 202 may assign the edges between the source node and the nodes in the first set of nodes a cost value of 0 as nodes originating from the source node in a flow network may not have any associated cost. Further, the processor 202 may assign each edge between the source node and the nodes in the first set of nodes a flow value of 1 as each node in the first set of nodes may have a cardinality of one. An example of the flow network F2 has been explained in conjunction with FIG. 6.

Figure 6:
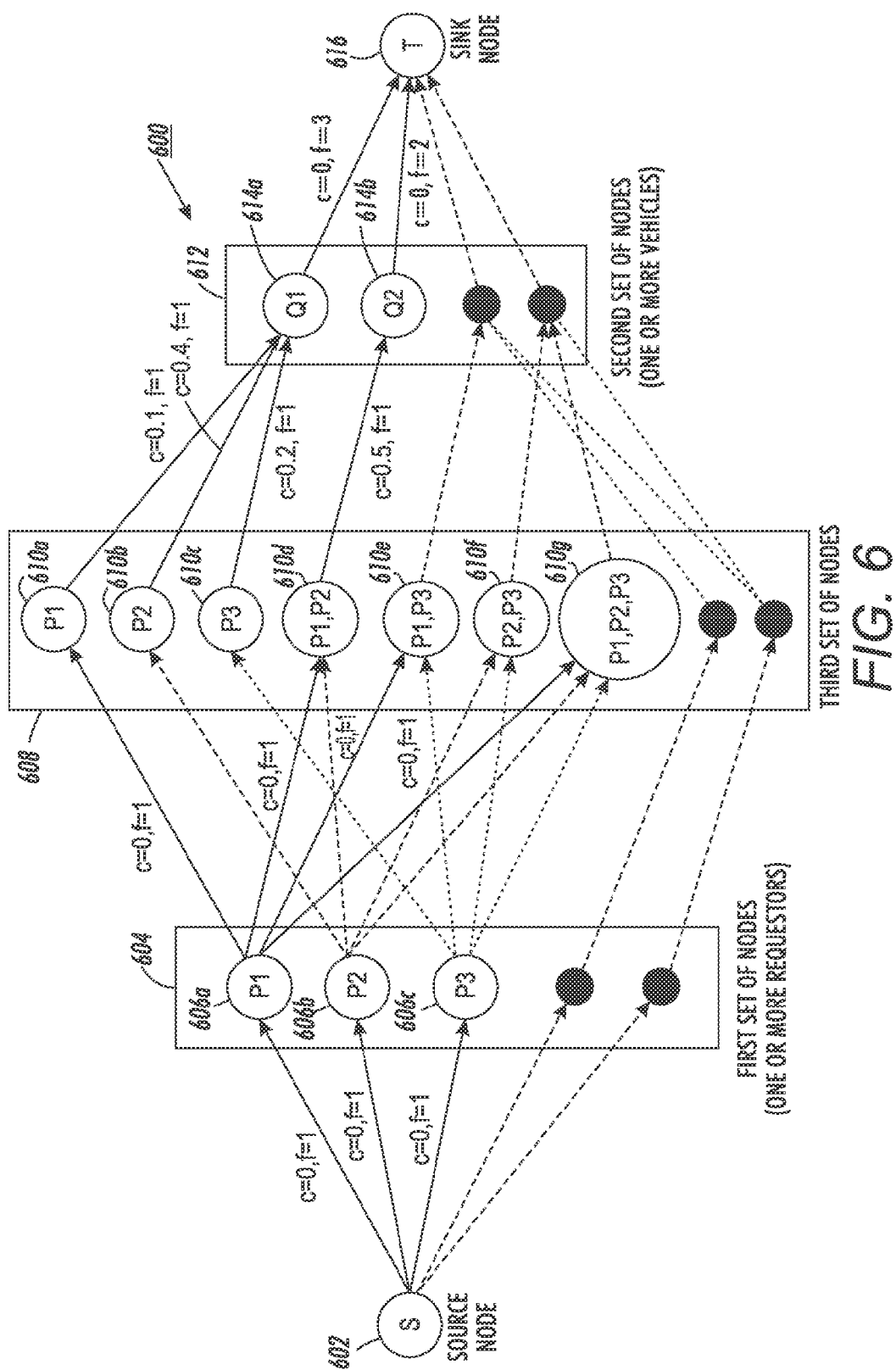
FIG. 6 Illustrates an example of a flow network, which may be created in case of one or more vehicles having fixed capacity, in accordance with at least one embodiment.

FIG. 6. Illustrates an example of the flow network 600, which may be created in case of the one or more vehicles having fixed capacity (created at the step 334), in accordance with at least one embodiment.

Referring to FIG. 6, the flow network 600 includes the source node S 602, the first set of nodes (representing the one or more requestors) 604, the third set of nodes (including a combination of one or more nodes from the first set of nodes) 608, the second set of nodes (representing the one or more vehicles) 612, and the sink node T 616. The source node S 602 is connected to nodes in the first set of nodes 604 such as a node P1 606a, a node P2 606b, a node P3 606c, and so on. Further, each such connection has a cost value of 0 and a flow value of 1. As shown in FIG. 6, the nodes in the first set of nodes 604 are connected to the respective nodes of the third set of nodes 608. For instance, the node P1 606a (belonging to the first set of nodes 604) is connected to the respective nodes of the third set of nodes 608 such as a node {P1} 610a, a node {P1, P2} 610d, a node {P1, P3} 610e, and a node {P1, P2, P3} 610g. The cost and flow values of each such connection is 0 and 1, respectively.

Further, each node in the third set of nodes 608 is connected to each node in the second set of nodes 612

(though all such connections are not shown in FIG. 6). The flow value of the edges between the third set of nodes 608 and the second set of nodes 612 depend on a cardinality of the respective nodes of the third set of nodes 608. For instance, the node {P1, P2} 610d has a cardinality of two as the node 610d represents two requestors P1 and P2. Thus, the flow value of the connections between the node 610d to nodes in the second set of nodes 612 such as a node Q2 614b is 2. The determination of the cost value of the edges between the third set of nodes 608 and the second set of nodes 612 has been explained in step 336. Further, each node in the second set of nodes is connected to the sink node T 616. The cost value of such connections is 0, while the flow value is determined using a min-cost max-flow algorithm, as discussed in step 338.

Referring back to FIG. 3C, at step 336, the second additional distance traversable by each of the one or more vehicles apart from the predefined route is determined. In an embodiment, the processor 202 is configured to determine the second additional distance. As discussed, each node in the third set of nodes includes a combination of one or more nodes from the first set of nodes. In an embodiment, the processor 202 may determine the various arrangements of such constituent sub-nodes in each node of the third set of nodes. For example, a node in the third set of node includes the sub-nodes A, B, and C. The processor 202 may determine the various arrangements of such sub-nodes as {A, B, C}, {A, C, B}, {B, A, C}, {B, C, A}, {C, A, B}, and {C, B, A}. Each such arrangement may correspond to a permutation of the constituent sub-nodes in the node belonging to the third set of nodes. For each such permutation of sub-nodes in each of the third set of nodes, the processor 202 may determine the second additional distance that each of the one or more vehicles has to traverse apart from the predefined route to accommodate the respective requestors. The processor 202 may use the following equations to determine the second additional distance that a vehicle traveling on the predefined route r has to travel to accommodate requestors associated with a node $V_S$ in the third set of nodes:

$$d(V_S, r) = \min_{1 \leq j \leq l!}(d_{min,j}) \text{ for each permutation } P_j \forall l \in V_S \quad (11)$$

$$\text{where, } d_{min,j} = \min_{0 \leq i < k}(d(r_i, p_i) + d(P_j) + d(p_l, r_{i+1}) - d(r_i, r_{i+1})) \quad (12)$$

$$d(P_j) = \Sigma_{q=2}^{l} d_{q-1,q} \quad (13)$$

where, $r_i$: $i^{th}$ drop location on the predefined route 'r';

$d(P_j)$: total distance between drop locations of requestors of node Vs in the permutation $P_j$;

$d_{q-1,q}$: distance between $(q-1)^{th}$ drop location and $q^{th}$ drop location of requestors of node $V_S$ in the permutation $P_j$;

l: number of requestors in the node $V_S$;

k: current number of passengers traveling on the predefined route r;

$d_{min,j}$: minimum distance that the vehicle of predefined route r has to travel to accommodate requestors of node $V_S$ in the permutation Pj;

$d(V_S, r)$: the second additional distance (i.e., the minimum value of $d_{min,j}$ over all permutations of requestors of node $V_S$);

$d(r_i, P_1)$: distance between the $i^{th}$ drop location on the predefined route r and the $1^{st}$ drop location in the permutation Pj of requestors of node $V_S$;

$d(P_l, r_{i+1})$: distance between the drop location of the last requestor of the node $V_S$ (i.e., the $i^{th}$ drop location) and the $(i+1)^{th}$ drop location on the predefined route r; and $d(r_i, r_{i+1})$: distance between the $i^{th}$ and the $(i+1)^{th}$ drop locations in the predefined route r.

A person skilled in the art will appreciate that the processor 202 may determine the values of the various distances in the above equations 12 and 13 using a Floyd-Warshall's algorithm on the graph G, which represents various locations of travel (refer step 302).

As discussed, each node in the third set of nodes includes a combination of nodes of the first set of nodes. The processor 202 may determine the second additional distance as the minimum value of the additional distances determined for each permutation of the sub-nodes in the third set of nodes. For example, the node $V_S$ includes requestors A, B, and C. Thus, there are six permutations of requestors for the node $V_S$ (as 3!=6). For the permutation "ABC," the processor 202 may determine $d_{min,1}$ (where, j=1) using equations 12 and 13. Similarly, the processor 202 may determine $d_{min,2}, d_{min,3}, \ldots d_{min,6}$ for the rest of the permutations using equations 12 and 13. Finally, the processor 202 may determine the second additional distance as the minimum of $d_{min,1}, d_{min,2}, \ldots d_{min,6}$ using equation 11. In an embodiment, the processor 202 may assign the second additional distance as a cost value between the connections of the respective nodes in the third set of nodes and the second set of nodes in the flow network F2.

Referring to the example flow network 600 of FIG. 6, the nodes in the third set of nodes 608 are connected to the nodes in the second set of nodes 612. As discussed above, the flow values of such connections depend on the cardinality of the respective nodes of the third set of nodes 608. In an embodiment, the processor 202 may assign the second additional distance $d(V_S, r)$ (determined using equations 10 and 11) as the cost value associated with the connection between the node $V_S$ in the third set of nodes and a node r in the second set of nodes (representing the predefined route of a vehicle). For instance, the processor 202 assigns a cost value of 0.5 to the connection between the node {P1, P2} 610d and the node Q2 614b if the processor 202 determines the second additional distance as 0.5 units for the requestors P1 and P2 to be accommodated in the route Q2.

Referring to FIG. 3C, at step 338, a mapping between the first set of nodes and the second set of nodes is determined. In an embodiment, the processor 202 is configured to determine the mapping between the first set of nodes and the second set of nodes based on the second additional distance determined at step 336. In an embodiment, the processor 202 may use a min-cost max-flow algorithm to determine the mapping in the flow network F2. For example, the processor 202 may use the min-cost max-flow algorithm such as a Klein algorithm to determine the mapping based on the second additional distance, subject to the constraint that a total flow value at the sink node is equal to the total number of requestors. In an embodiment, a flow value between each of the second set of nodes and the sink node may be at most equal to the number of vacancies in the respective vehicles represented by the second set of nodes.

Referring to the example flow network 600 of FIG. 6, the processor 202 may determine the mapping between the first set of nodes 604 and the second set of nodes 612 through the third set of nodes 608 using the min-cost max-flow algorithm. For instance, the processor 202 may determine the mapping as an allocation of the requestors P1 and P2 to the vehicle Q2, as the node {P1, P2} 610d is connected to the node Q2 614b and the final flow from the node Q2 614b to the sink node T 616 is 2. A person skilled in the art will appreciate that multiple solutions may be possible for the same set of requestors and the same set of vehicles without departing from the spirit of the disclosure.

Referring to FIG. 3C, at step 340, the one or more vehicles are recommended for the one or more requestors based on the mapping. In an embodiment, the processor 202 is configured to recommend the one or more vehicles for the one or more requestors based on the mapping. For example, the processor 202 may recommend the vehicle Q2 for the requestors P1 and P2 (as shown in FIG. 6). In an embodiment, the processor 202 may update the predefined routes of the one or more vehicles based on the mapping to accommodate the one or more requestors. For example, based on the second additional distance, the processor 202 may determine that the requestors P1 and P2 may be dropped off (in the order P1 followed by P2) between the $i^{th}$ and the $(i+1)^{th}$ drop locations of the route of the vehicle Q2. The processor 202 may accordingly update the route of the vehicle Q2 to accommodate the requestors P1 and P2 between the previous $i^{th}$ and $(i+1)^{th}$ drop locations. In an embodiment, the processor 202 may recommend the one or more vehicles for the one or more requestors on the transport manager-computing device 106. An example of a user-interface presenting the recommendation of the one or more vehicles for the one or more requestors on the transport manager-computing device 106 has been explained in conjunction with FIG. 8. The step 340 is similar to the step 326.

At step 342, a notification indicative of the recommendation is sent. In an embodiment, the processor 202 is configured to send the notification indicative of the recommendation. In an embodiment, the processor 202 may send the notification to computing devices installed on the one or more vehicles (e.g., the operator-computing device 110), computing devices of the one or more requestors (e.g., the requestor-computing device 108), and/or computing devices used by one or more individuals managing a scheduling of the one or more vehicles (e.g., the transport manager-computing device 106). Examples of the notifications include, but are not limited to, a short messaging service (SMS) message, an email message, a multimedia message, or any other message. An example of a user-interface presenting the notification indicative of the recommendation has been explained in conjunction with FIG. 9 and FIG. 10. The step 342 is similar to the step 328.

Figure 7:
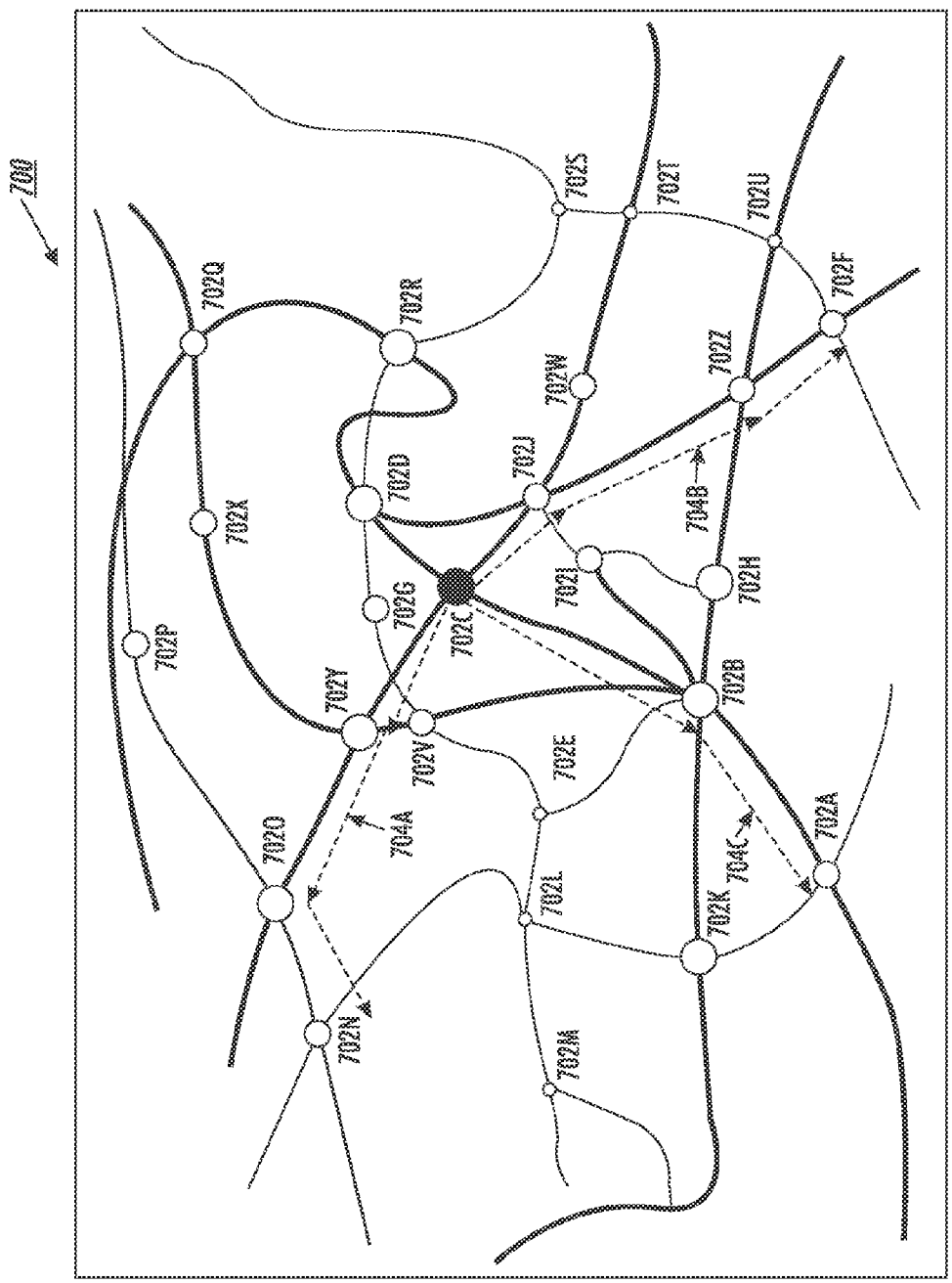
FIG. 7 illustrates an example user-interface presenting predefined routes of one or more vehicles, which may be displayed on a transport manager's computing device, in accordance with at least one embodiment.

FIG. 7 illustrates an example user-interface 700 presenting the predefined routes of the one or more vehicles, which may be displayed on the transport manager-computing device 106, in accordance with at least one embodiment.

As shown in FIG. 7, the user-interface 700 depicts the predefined routes of the one or more vehicles on a map of locations of travel in a geographical area (e.g., a city). As discussed, in an embodiment, the first set of requestors (and the one or more requestors) may have a common source location such as a location 702c. The routes such as a route 704a, a route 704b, and a route 704c may originate from the common source location 702c. In an embodiment, a single vehicle may ply on each such route. However, the scope of the disclosure is not limited to a single vehicle plying on a single route. Multiple vehicles may also ply on a single route without departing from the spirit of the disclosure. As shown in FIG. 7, each route covers multiple locations in a predetermined order. For instance, the route 704a covers the locations 702c→702y→702o→702n. Similarly, the route 704b covers the locations 702c→702j→702z→702f, and so on.

A person skilled in the art will appreciate that scope of the disclosure should not be limited to the requestors having a common source location (i.e., the location 702c). In an embodiment, the requestors may have a common destination location without departing from the spirit of the disclosure.

Figure 8:
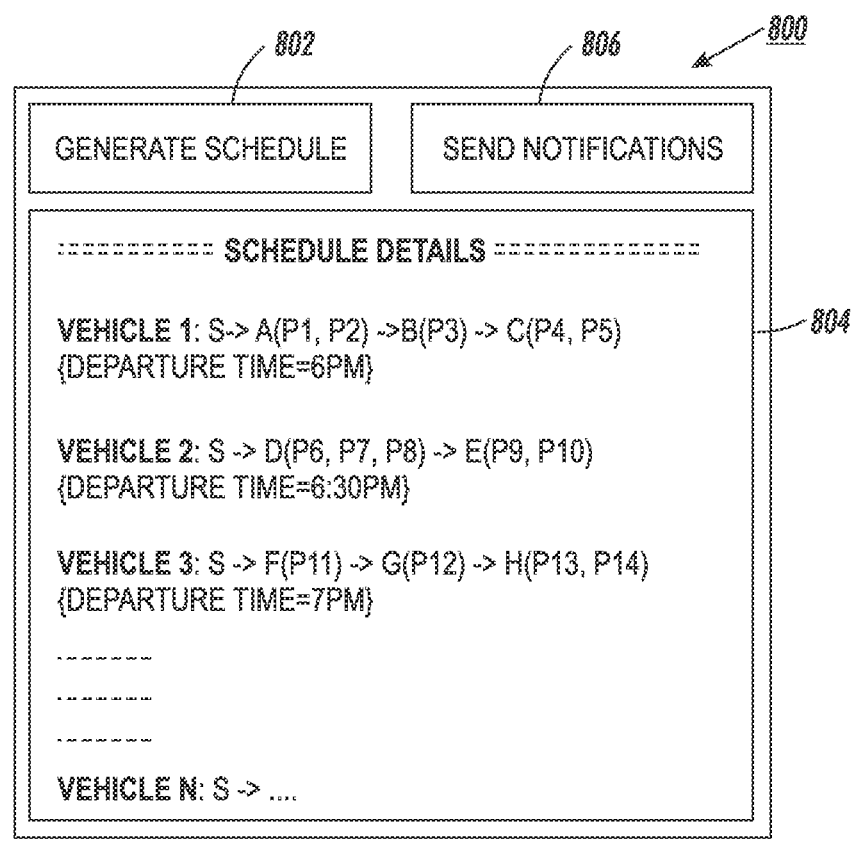
FIG. 8 illustrates an example user-interface that may be presented on a transport manager's computing device to display a recommendation of one or more vehicles for one or more requestors, in accordance with at least one embodiment.

FIG. 8 illustrates an example user-interface 800 that may be presented on the transport manager-computing device 106 to display the recommendation of the one or more vehicles for the one or more requestors, in accordance with at least one embodiment.

As shown in FIG. 8, the user may press a generate schedule button 802 in the user-interface 800, to initiate a generation of recommendations of the one or more vehicles for the one or more requestors. The generated recommendations may be displayed in a region 804 in the user-interface 800. For instance, through the region 804 of the user-interface 800, the recommended schedules of N vehicles are displayed. For example, as shown in FIG. 8, the recommended schedule of "Vehicle 1" corresponds to a departure from the source location S at 6 PM through the route A→B→C. According to the recommended schedule of the Vehicle 1, requestors P1 and P2 are to be dropped at the location A, a requestor P3 is to be dropped at the location B, and requestors P4 and P5 are to be dropped at the location C. Similarly, the recommended route for a "Vehicle 2" corresponds to traveling on a route S→D→E while dropping requestors P6, P7, and P8 at the location D and requestors P9 and P10 at the location E, and so on.

Further, the user-interface 800 may include a send notifications button 806, which on being pressed by the user may initiate a transmission of notifications to the computing devices of the requestors (e.g., the requestor-computing device 108) and the computing devices associated with the one or more vehicles (e.g., the operator-computing device 110). The notifications transmitted to the requestor-computing device 108 may include a recommendation of the vehicles assigned to the respective requestors. On the other hand, the notifications transmitted to the operator-computing device 110 may include a recommendation of the requestors assigned to the respective vehicles. An example of a user-interface that may be presented on the requestor-computing device 108 to display the notification is explained in conjunction with FIG. 9. Further, an example of a user-interface that may be presented on the operator-computing device 110 to display the notification is explained in conjunction with FIG. 10.

Though not shown, the user-interface 800 may also include a region to update travel details of the one or more requestors and the first set of requestors. For example, the user may add, cancel, or modify travel requests for various requestors through the user-interface 800.

Figure 9:
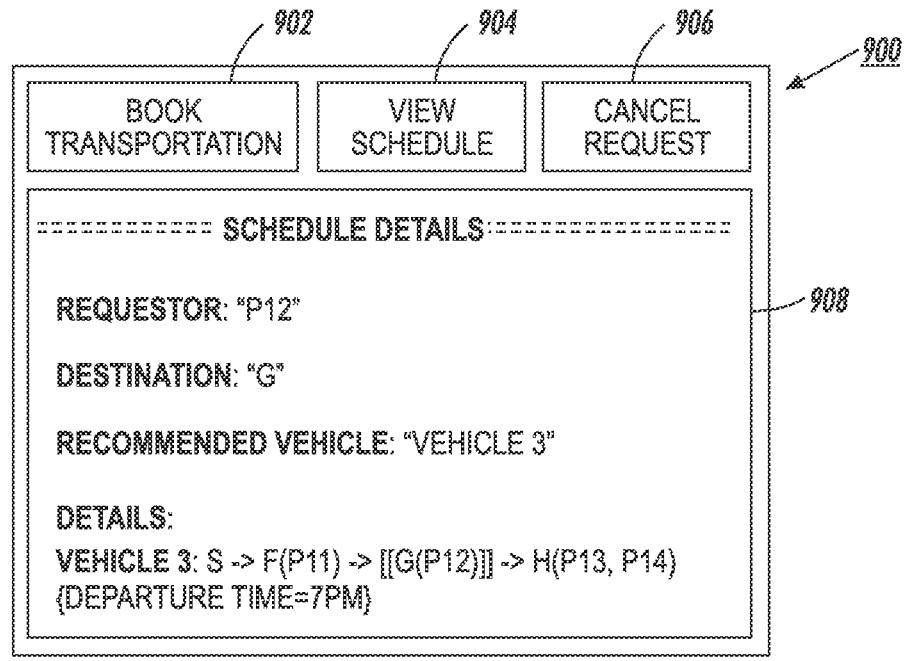
FIG. 9 illustrates an example user-interface that may be presented on a requestor's computing device to display a notification of a recommendation of a vehicle from one or more vehicles for the requestor, in accordance with at least one embodiment.

FIG. 9 illustrates an example user-interface 900 that may be presented on the requestor-computing device 108 to display the notification of the recommendation of a vehicle from the one or more vehicles for the requestor, in accordance with at least one embodiment.

As shown in FIG. 9, the user-interface 900 may include a book transportation button 902, which may be used by the requestor to add/update his/her travel request. The requestor-computing device 108 may display an appropriate form to capture the requestor's travel details when the requestor presses the book transportation button 902. The user-interface 900 also may include a cancel request button 906, which may be used by the requestor to cancel an existing travel request of the requestor. Again, the requestor-computing device 108 may display an appropriate form to capture reason why the requestor wants to cancel the travel request.

Further, as shown in FIG. 9, the user-interface 900 may include a view schedule button 904, which may be used by the requestor to view a notification of the recommended vehicle for the requestor. When the requestor presses the view schedule button 904, the user-interface 900 may display the notification in a region 908. For instance, the notification includes a recommendation of a "Vehicle 3" for the requestor "P12" to travel to a destination location "G." The notification may also include an indicative route of the recommended vehicle. For instance, the Vehicle 3 travels on the route S→F→G→H and has a departure time of 7 PM from the source location S.

Figure 10:
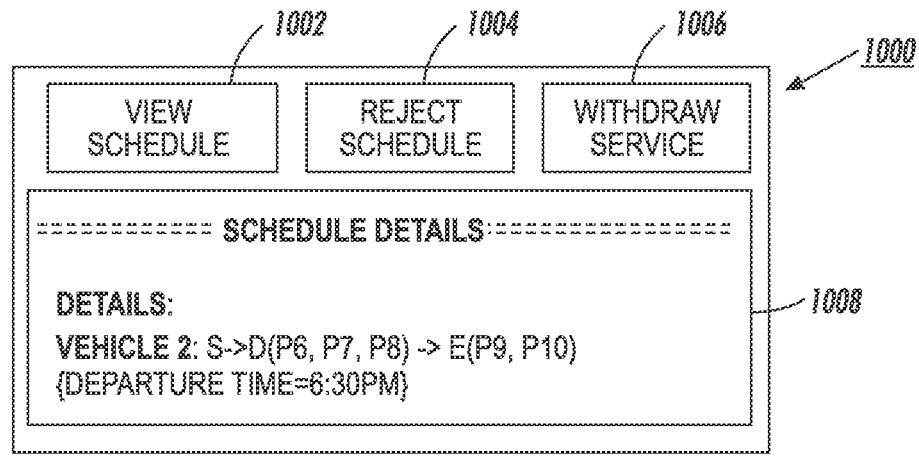
FIG. 10 illustrates an example user-interface that may be presented on a vehicle-operator's computing device to display a notification of a recommendation of requestors assigned to the vehicle, in accordance with at least one embodiment.

FIG. 10 illustrates an example user-interface 1000 that may be presented on the operator-computing device 110 to display the notification of the recommendation of the requestors assigned to the vehicle, in accordance with at least one embodiment.

As shown in FIG. 10, the user-interface 1000 may include a view schedule button 1002, which may be used to view the notification of the recommended schedule associated with the vehicle. When the view schedule button 1002 is pressed, the notification of the recommended schedule may be displayed in a region 1008. For instance, the region 1008 displays the notification of the recommended schedule for the "Vehicle 2" as S→D→E with a departure time of 6.30 PM from the source location S. According to the recommended schedule, the "Vehicle 2" has to drop requestors P6, P7, and P8 at the location D, and requestors P9 and P10 at the location E.

The user-interface 1000 may further include a reject schedule button 1004 and a withdraw service button 1006. By pressing the reject schedule button 1004, an operator of the vehicle may reject the recommended schedule and may request for rescheduling. In such a scenario, either the vehicle may be removed from the current shift and replaced by another vehicle on the same route or the route of the vehicle may be swapped with the route of another vehicle. However, in case the operator of the vehicle presses the withdraw service button 1006, a new vehicle may be requested and made to ply on the route recommended for the withdrawn vehicle.

A person skilled in the art will appreciate that example user-interfaces 800, 900, and 1000 are for illustrative purposes and should not be construed to limit the scope of the disclosure.

The disclosed embodiments encompass numerous advantages. The disclosure provides for a recommendation of one or more vehicles for one or more requestors. As discussed, a first set of requestors may be assigned to predefined routes of the one or more vehicles using an ILP technique. Determining such predefined routes in an offline manner may require a large amount of time and may not be useful to accommodate real-time changes. Examples of the real-time changes include new travel requests from one or more requestors (not within the first set of requestors) and cancellations of travel requests of certain requestors in the first set of requestors. The disclosure provides for use of a min-cost max-flow algorithm on a flow network generated from a bipartite graph of a first set of nodes (representing the one or more requestors) and a second set of nodes (representing the one or more vehicles). The flow network-based solution may be obtained in a real-time and may not require a large amount of time.

Further, as discussed, the disclosure provides for removal of a vehicle from the one or more vehicles in case of the current number of vacancies in the vehicles is greater than the number of requestors even after removing the vehicle (steps 304 and 306). The requestors previously assigned to this vehicle may be assigned to the remaining vehicles. Removing such extra vehicles may result in a cost saving for the requestors and/or an organization, which hires the vehicles for the requestors (e.g., the employer of the requestors).

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for recommending one or more vehicles for one or more requestors have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for dispatching one or more vehicles, commuting on a predefined route, for one or more requestors, the method comprising:
    determining, by one or more processors, for each of said one or more requestors, a first additional distance that each of said one or more vehicles has to traverse apart from said predefined route to accommodate said one or more requestors;
    generating, by said one or more processors, a graph comprising a first set of nodes and a second set of nodes, wherein said first set of nodes corresponds to said one or more requestors and said second set of nodes corresponds to said one or more vehicles;
    determining, by said one or more processors, a mapping between said first set of nodes and said second set of nodes based on at least said first additional distance, wherein said mapping corresponds to an allocation of a requestor, from said one or more requestors, to a vehicle, from said one or more vehicles, such that an additional distance traversable by said vehicle apart from said predefined route is less than an additional distance traversable by each of remaining of said one or more vehicles apart from said predefined route, for accommodating said requestor; and
    dispatching, by said one or more processors, said one or more vehicles to said one or more requestors on a computing device based on said mapping.

2. The method of claim 1, wherein said graph corresponds to a flow network such that each of said first set of nodes is connected with a source node, each of said second set of nodes is connected with a sink node, each of said first set of nodes is connected with each of said second set of nodes, and each edge in said graph has an associated cost and an associated flow value, wherein said first additional distance corresponds to a cost of an edge between each of said first set of nodes and each of said second set of nodes.

3. The method of claim 2, wherein said mapping is determined by utilizing a minimum cost maximum flow technique on said flow network based on said additional distance.

4. The method of claim 1, wherein when a capacity of said one or more vehicles is fixed, said graph further comprises a third set of nodes, wherein said third set of nodes comprises a combination of one or more nodes from said first set of nodes.

5. The method of claim 4 further comprises determining, by said one or more processors, for each permutation of said one or more nodes of said third set of nodes, a second additional distance that each of said one or more vehicles has to traverse apart from said predefined route to accommodate respective requestors corresponding to said permutation of said one or more nodes.

6. The method of claim 5, wherein said mapping is based on said second additional distance.

7. The method of claim 1, wherein when a capacity of said one or more vehicles is variable, a first requestor, from said one or more requestors, who is allocated to a vehicle, is removed from said first set of nodes, and a first vehicle, from said one or more vehicles, which does not have vacancy, is removed from said second set of nodes.

8. The method of claim 7 further comprising generating, by said one or more processors, a second graph comprising said modified first set of nodes and said modified second set of nodes.

9. The method of claim 1 further comprising adding, by said one or more processors, a vehicle with said predefined route to said one or more vehicles, based on a number of vacancies in said one or more vehicles and a number of said one or more requestors.

10. The method of claim 1, wherein said predefined route is determined by utilizing an integer linear programming technique.

11. The method of claim 1 further comprising removing, by said one or more processors, a vehicle from said one or more vehicles, based on a number of vacancies in said one or more vehicles, a number of said one or more requestors, and a capacity of said vehicle.

12. The method of claim 11, wherein a set of requestors allocated to said removed vehicle is added to said one or more requestors, for allocation to remaining of said one or more vehicles.

13. The method of claim 1 further comprising sending, by a transceiver, a notification to a computing device of each of said one or more requestors, wherein said notification includes said recommendation of said one or more vehicles for said one or more requestors.

14. The method of claim 1 further comprising sending, by a transceiver, a notification to a computing device associated with each of said one or more vehicles, wherein said notification includes said recommendation of said one or more requestors for said one or more vehicles.

15. A system for dispatching one or more vehicles, commuting on a predefined route, for one or more requestors, the system comprising:
one or more processors configured to:
determine for each of said one or more requestors, a first additional distance that each of said one or more vehicles has to traverse apart from said predefined route to accommodate said one or more requestors;
generate a graph comprising a first set of nodes and a second set of nodes, wherein said first set of nodes corresponds to said one or more requestors and said second set of nodes corresponds to said one or more vehicles;
determine a mapping between said first set of nodes and said second set of nodes based on at least said first additional distance, wherein said mapping corresponds to an allocation of a requestor, from said one or more requestors, to a vehicle, from said one or more vehicles, such that an additional distance traversable by said vehicle apart from said predefined route is less than an additional distance traversable by each of remaining of said one or more vehicles apart from said predefined route, for accommodating said requestor; and
dispatching said one or more vehicles to said one or more requestors on a computing device based on said mapping.

16. The system of claim 15, wherein when a capacity of said one or more vehicles is fixed, said graph further comprises a third set of nodes, wherein said third set of nodes comprises a combination of one or more nodes from said first set of nodes.

17. The system of claim 16, wherein said one or more processors are further configured to determine, for each permutation of said one or more nodes of said third set of nodes, a second additional distance that each of said one or more vehicles has to traverse from said predefined route to accommodate respective requestors corresponding to said permutation of said one or more nodes.

18. The system of claim 17, wherein said mapping is based on said second additional distance.

19. The system of claim 15, wherein when a capacity of said one or more vehicles is variable, a first requestor, from said one or more requestors, who is allocated to a vehicle, is removed from said first set of nodes, and a first vehicle, from said one or more vehicles, which does not have vacancy, is removed from said second set of nodes.

20. The system of claim 19, wherein said one or more processors are further configured to generate a second graph comprising said modified first set of nodes and said modified second set of nodes.

21. A computer program product for use with a computer, the computer program product comprising a non-transitory computer readable medium, wherein the non-transitory computer readable medium stores a computer program code for dispatching one or more vehicles, commuting on a predefined route, for one or more requestors, wherein the computer program code is executable by one or more processors to:
determine for each of said one or more requestors, a first additional distance that each of said one or more vehicles has to traverse apart from said predefined route to accommodate said one or more requestors;
generate a graph comprising a first set of nodes and a second set of nodes, wherein said first set of nodes corresponds to said one or more requestors and said second set of nodes corresponds to said one or more vehicles;
determine a mapping between said first set of nodes and said second set of nodes based on at least said first additional distance, wherein said mapping corresponds to an allocation of a requestor, from said one or more requestors, to a vehicle, from said one or more vehicles, such that an additional distance traversable by said vehicle apart from said predefined route is less than an additional distance traversable by each of remaining of said one or more vehicles apart from said predefined route, for accommodating said requestor; and
dispatch said one or more vehicles to said one or more requestors on a computing device based on said mapping.

* * * * *